United States Patent
Li et al.

(10) Patent No.: US 12,177,087 B2
(45) Date of Patent: Dec. 24, 2024

(54) TRAFFIC FLOW IDENTIFICATION METHOD AND APPARATUS, AND MODEL GENERATION METHOD AND APPARATUS

(71) Applicant: Huawei Technologies Co., Ltd., Shenzhen (CN)

(72) Inventors: Zhengbing Li, Shenzhen (CN); Ping Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 336 days.

(21) Appl. No.: 17/624,190

(22) PCT Filed: Jul. 1, 2020

(86) PCT No.: PCT/CN2020/099614
§ 371 (c)(1),
(2) Date: Dec. 30, 2021

(87) PCT Pub. No.: WO2021/000874
PCT Pub. Date: Jan. 7, 2021

(65) Prior Publication Data
US 2022/0368604 A1    Nov. 17, 2022

(30) Foreign Application Priority Data
Jul. 1, 2019 (CN) .......................... 201910586336.3

(51) Int. Cl.
*H04L 41/147* (2022.01)
*H04L 41/16* (2022.01)
*H04L 45/74* (2022.01)

(52) U.S. Cl.
CPC ............ *H04L 41/147* (2013.01); *H04L 45/74* (2013.01)

(58) Field of Classification Search
None
See application file for complete search history.

(56) References Cited

U.S. PATENT DOCUMENTS 8,213,453 B1 *   7/2012   Voruganti ............... H04L 47/30
                                                          370/395.42
9,843,596 B1 *   12/2017  Averbuch .............. G06F 21/554
                          (Continued)

FOREIGN PATENT DOCUMENTS

CN        1744573 A       3/2006
CN      101695035 A       4/2010
                (Continued)

OTHER PUBLICATIONS

Programmers with attitude et al.,"Get online user's hostname, ip, OS, manufacturer," total 2 pages (May 18, 2018).

*Primary Examiner* — Duc T Duong
(74) *Attorney, Agent, or Firm* — Leydig, Voit & Mayer, Ltd.

(57) ABSTRACT

This application provides a traffic flow identification method and apparatus, and a model generation method and apparatus. The traffic flow identification method includes: A first device obtains a to-be-identified traffic flow, collects statistics about packet header information in the to-be-identified traffic flow in a preset time window, to obtain to-be-identified packet header statistics information, and obtains to-be-identified terminal-side information based on the to-be-identified traffic flow. Further, the first device determines a type of the to-be-identified traffic flow based on the to-be-identified terminal-side information and the to-be-identified packet header statistics information by using a traffic flow identification model. Therefore, the first device can fully consider, by using the traffic flow identification model, attribute information of a device associated with the traffic flow, to improve an identification rate of the type of the traffic flow, and ensure an identification effect of the type of the traffic flow.

20 Claims, 11 Drawing Sheets

(56) References Cited

U.S. PATENT DOCUMENTS

| | | | | |
|---|---|---|---|---|
| 2010/0250918 | A1* | 9/2010 | Tremblay | H04L 47/2441 |
| | | | | 706/46 |
| 2013/0054619 | A1* | 2/2013 | Liu | H04L 43/028 |
| | | | | 707/E17.061 |
| 2013/0100849 | A1* | 4/2013 | Szabo | H04L 47/2441 |
| | | | | 370/253 |
| 2013/0148513 | A1* | 6/2013 | Szabo | H04L 41/142 |
| | | | | 370/252 |
| 2015/0032883 | A1 | 1/2015 | Chandrashekar | |
| 2016/0105364 | A1 | 4/2016 | Kanonakis et al. | |
| 2016/0191348 | A1* | 6/2016 | Lee | H04L 43/028 |
| | | | | 709/224 |
| 2017/0318082 | A1 | 11/2017 | Thakur et al. | |
| 2017/0374089 | A1* | 12/2017 | Anderson | G06N 20/00 |
| 2018/0014224 | A1 | 1/2018 | Cheng et al. | |
| 2018/0152467 | A1* | 5/2018 | Anderson | H04L 47/2441 |
| 2018/0212992 | A1* | 7/2018 | Nikolaev | H04L 43/0876 |
| 2018/0234453 | A1* | 8/2018 | Le | H04L 63/10 |
| 2019/0279113 | A1* | 9/2019 | Liu | G06N 20/00 |
| 2019/0327254 | A1* | 10/2019 | Zaifman | G06N 7/01 |
| 2019/0392354 | A1* | 12/2019 | Yang | G06N 5/04 |
| 2020/0067935 | A1* | 2/2020 | Carnes, III | H04L 63/101 |
| 2020/0169509 | A1* | 5/2020 | Tigli | H04L 47/2483 |
| 2020/0186547 | A1* | 6/2020 | Bartos | G06N 20/00 |
| 2020/0296011 | A1* | 9/2020 | Jain | H04L 43/026 |
| 2020/0366717 | A1* | 11/2020 | Chaubey | H04L 63/102 |

FOREIGN PATENT DOCUMENTS

| | | |
|---|---|---|
| CN | 102045363 A | 5/2011 |
| CN | 102315974 A | 1/2012 |
| CN | 103582512 A | 2/2014 |
| CN | 106330584 A | 1/2017 |
| CN | 106503617 A | 3/2017 |
| CN | 107483458 A | 12/2017 |
| CN | 107710687 A | 2/2018 |
| CN | 108011976 A | 5/2018 |
| CN | 108574667 A | 9/2018 |
| CN | 108667747 A | 10/2018 |
| CN | 110460488 A | 11/2019 |
| WO | 2017061895 A1 | 4/2017 |
| WO | 2017092502 A1 | 6/2017 |

* cited by examiner

TRAFFIC FLOW IDENTIFICATION METHOD AND APPARATUS, AND MODEL GENERATION METHOD AND APPARATUS

CROSS-REFERENCE TO RELATED APPLICATIONS

This application is a National Stage of International Application No. PCT/CN2020/099614, filed on Jul. 1, 2020, which claims priority to Chinese Patent Application No. 201910586336.3, filed on Jul. 1, 2019, both of which are hereby incorporated by reference in their entireties.

TECHNICAL FIELD

Embodiments of this application relate to the field of computer communications technologies, and in particular, to a traffic flow identification method and apparatus, and a model generation method and apparatus.

BACKGROUND

Usually, data exchanged between an application and a server is referred to as a traffic flow. With continuous development of intelligent terminals, applications grow explosively, and traffic flows are complex. Therefore, a type of the traffic flow needs to be identified for further processing. For example, different applications have different requirements for quality of service (QoS). For example, a game application has a higher latency requirement than a video application. For example, the game application requires a latency of less than 100 ms, and a latency of 1 s does not significantly affect the video application. For another example, after the type of the traffic flow is identified, traffic control may be performed to avoid attacks and ensure device security. For another example, after the type of the traffic flow is identified, content control may be performed to prevent children from addicting to games and assist parents in management.

Currently, there are two conventional traffic flow identification methods. In one method, a traffic flow identification model is generated by analyzing application layer protocol payload content and using a deep packet inspection (DPI) technology, and a type of a traffic flow is identified by using the traffic flow identification model. However, the DPI technology is likely affected by encryption. In the other method, a traffic flow identification model is generated based on packet header information (for example, a port, an IP address, a packet generation time point, and a packet byte length) of a data link layer/network layer/transport layer protocol by using a deep/dynamic flow inspection (DFI) technology, and a type of a traffic flow is identified by using the traffic flow identification model. However, identification precision is low, and an identification effect is poor.

SUMMARY

This application provides a traffic flow identification method and apparatus, and a model generation method and apparatus, to improve an identification rate of a type of a traffic flow, and ensure an identification effect of the type of the traffic flow.

According to a first aspect, this application provides a traffic flow identification method, including: A first device obtains a to-be-identified traffic flow. The first device obtains to-be-identified terminal-side information and to-be-identified packet header statistics information based on the traffic flow, where the terminal-side information is used to indicate attribute information of a device associated with the traffic flow, and the packet header statistics information is information obtained by collecting statistics about packet header information in the traffic flow in a preset time window. The first device determines a type of the traffic flow based on the terminal-side information and the packet header statistics information by using a traffic flow identification model.

According to the traffic flow identification method provided in the first aspect, the first device obtains the to-be-identified traffic flow, collects statistics about the packet header information in the to-be-identified traffic flow in the preset time window, to obtain the to-be-identified packet header statistics information, and obtains the to-be-identified terminal-side information based on the to-be-identified traffic flow. Further, the first device determines the type of the to-be-identified traffic flow based on the to-be-identified terminal-side information and the to-be-identified packet header statistics information by using the traffic flow identification model. In this application, the first device can fully consider, by using the traffic flow identification model, the attribute information of the device associated with the traffic flow, to improve an identification rate of the type of the traffic flow, and ensure an identification effect of the type of the traffic flow.

In a possible design, before the first device determines a type of the traffic flow based on the terminal-side information and the packet header statistics information by using a traffic flow identification model, the method further includes: The first device sends the terminal-side information to a second device. The first device receives the traffic flow identification model that is sent by the second device and that corresponds to the terminal-side information.

According to the traffic flow identification method provided in the embodiments, when obtaining the to-be-identified traffic flow, the first device may obtain, from the second device, the traffic flow identification model that matches the to-be-identified terminal-side information, or may obtain a traffic identification model with a maximum similarity based on a similarity between the terminal-side information and a frequent itemset, or may simultaneously perform the foregoing two processes to invoke the traffic flow identification model or update the traffic flow identification model stored in the first device, to accurately identify the type of the traffic flow.

In a possible design, that the first device determines a type of the traffic flow based on the terminal-side information and the packet header statistics information by using a traffic flow identification model includes: The first device generates an application sample based on the terminal-side information and the packet header statistics information. The first device determines the type of the traffic flow based on the application sample by using the traffic identification model.

In a possible design, the type of the traffic flow is an application type in the traffic flow, or the type of the traffic flow is an application type in the traffic flow and an application operation type in the traffic flow.

In a possible design, the method further includes: The first device performs, based on the type of the traffic flow, corresponding operations such as differentiated transmission of the traffic flow, traffic control, and content control.

Optionally, the first device may preferentially send a traffic flow with a high QoS requirement to a corresponding service server. For example, when a first application has a higher QoS requirement than a second application, when determining that to-be-identified traffic flows are respectively a traffic flow corresponding to the first application and a traffic flow corresponding to the second application, the first device may first send the traffic flow corresponding to the first application to the corresponding service server, and then send the traffic flow corresponding to the second application to the corresponding service server.

Optionally, the first device may preferentially send a traffic flow with a high latency requirement to the corresponding service server. For example, because a game application has a higher latency requirement than a video application, when determining that to-be-identified traffic flows are respectively traffic flows corresponding to the game applications and traffic flows corresponding to the video applications, the first device may first send the traffic flows corresponding to the game applications to the corresponding service server, and then send the traffic flows corresponding to the video applications to the corresponding service server.

Optionally, the first device may delay sending a traffic flow of a preset type to the corresponding service server. For example, when a first server learns that a processing rate of a service server corresponding to the traffic flow of the preset type is low, when determining that the type of the to-be-identified traffic flow is the preset type, the first device may send the to-be-identified traffic flow to the corresponding service server after delaying preset duration. Specific duration of the preset duration is not limited in this application.

Optionally, the first device may not send the traffic flow of the preset type to the corresponding service server. For example, when an operation a in an application A is not suitable for viewing by a child, when determining that the type of the to-be-identified traffic flow is an application operation type a in the application A, the first device may not send a traffic flow corresponding to the application operation type a in the application A to the corresponding service server.

It should be noted that the first device includes but is not limited to performing the foregoing corresponding operations based on the type of the traffic flow.

In a possible design, when the first device is a terminal device or a base station, the terminal-side information includes at least one of the following: a brand of the terminal device, a model of the terminal device, a channel indicator of the terminal device, an operating system of the terminal device, a firmware version of the terminal device, and an application name in the traffic flow. Alternatively, when the first device is a router, the terminal-side information includes at least one of the following: a brand of the terminal device, a model of the terminal device, a channel indicator of the terminal device, an operating system of the terminal device, a firmware version of the terminal device, a brand of the router, a model of the router, an operating system of the router, and a firmware version of the router.

In a possible design, the packet header information includes at least one of the following: 5-tuple information in the traffic flow, a packet generation time point corresponding to the 5-tuple information, and a packet byte length corresponding to the 5-tuple information.

In a possible design, the packet header statistics information includes at least one of the following: an average value of packet byte lengths in the traffic flow, a largest value of the packet byte lengths in the traffic flow, a smallest value of the packet byte lengths in the traffic flow, an average value of time intervals between two adjacent packets in the traffic flow, a largest value of the time intervals between the two adjacent packets in the traffic flow, and a smallest value of the time intervals between the two adjacent packets in the traffic flow.

According to a second aspect, this application provides a model generation method, including: A second device obtains packet header information in a to-be-trained traffic flow, to-be-trained terminal-side information, and a type of the to-be-trained traffic flow, where the terminal-side information is used to indicate attribute information of a device associated with the traffic flow. The second device collects statistics about the packet header information in the traffic flow in a preset time window, to obtain to-be-trained packet header statistics information. The second device performs model training based on the terminal-side information, the packet header statistics information, and the type of the traffic flow, to generate a traffic flow identification model.

According to the model generation method provided in the second aspect, the second device obtains the packet header information in the to-be-trained traffic flow, the to-be-trained terminal-side information used to indicate the attribute information of the device associated with the traffic flow, and the type of the to-be-trained traffic flow. The second device collects statistics about the packet header information in the traffic flow in the preset time window, to obtain the to-be-trained packet header statistics information. The second device performs model training based on the to-be-trained header statistics information, the to-be-trained terminal-side information, and the type of the to-be-trained traffic flow, to generate the traffic flow identification model. In this application, the type of the traffic flow and the packet header information are considered, and the attribute information of the device associated with the traffic flow is considered, to generate the traffic flow identification model with high identification precision and accuracy. In this way, the traffic flow identification model is used, so that an identification rate of the type of the traffic flow can be improved, and an identification effect of the type of the traffic flow can be ensured.

In a possible design, that the second device performs model training based on the terminal-side information, the packet header statistics information, and the type of the traffic flow, to generate a traffic flow identification model includes: The second device generates a training sample based on the terminal-side information and the packet header statistics information. The second device determines an application type in the traffic flow as the type of the traffic flow. The second device annotates a type of the training sample based on the type of the traffic flow, to obtain an annotated training sample. The second device performs model training based on the annotated training sample, to generate a traffic flow identification model applicable to a coarse-grained scenario, so that the second device provides a model that can identify the application type in the traffic flow.

In a possible design, that the second device determines an application type in the traffic flow as the type of the traffic flow includes: The second device determines the application type in the traffic flow and an application operation type in the traffic flow as the type of the traffic flow. Therefore, the second device performs model training based on the annotated training sample, to generate a traffic flow identification model applicable to a fine-grained scenario, so that the second device provides a model that can identify the application operation type in the traffic flow.

In a possible design, the method further includes: The second device generates N frequent itemsets based on the terminal-side information, where N is a positive integer. That the second device performs model training based on the annotated training sample, to generate the traffic flow identification model includes: The second device separately filters the annotated training sample based on the N frequent itemsets, to obtain a filtered training sample. A model server performs model training based on the filtered training sample, to generate the traffic flow identification model.

According to the model generation method provided in the embodiments, the second device may introduce one or more frequent itemsets associated with the to-be-trained terminal-side information, and filter the terminal-side information by introducing the frequent itemsets, to generate a simplified traffic flow identification model. In this way, a scale of the traffic flow identification model is reduced, storage space of the second device is reduced, an identification rate of the traffic flow identification model is further improved, and an identification effect of the traffic flow identification model is effectively ensured.

In a possible design, the terminal-side information includes at least one of the following: a brand of a terminal device, a model of the terminal device, a channel indicator of the terminal device, an operating system of the terminal device, a firmware version of the terminal device, a brand of a router, a model of the router, an operating system of the router, and a firmware version of the router.

In a possible design, the packet header information includes at least one of the following: 5-tuple information in the traffic flow, a packet generation time point corresponding to the 5-tuple information, and a packet byte length corresponding to the 5-tuple information.

In a possible design, the packet header statistics information includes at least one of the following: an average value of packet byte lengths in the traffic flow, a largest value of the packet byte lengths in the traffic flow, a smallest value of the packet byte lengths in the traffic flow, an average value of time intervals between two adjacent packets in the traffic flow, a largest value of the time intervals between the two adjacent packets in the traffic flow, and a smallest value of the time intervals between the two adjacent packets in the traffic flow.

According to a third aspect, this application provides a traffic flow identification apparatus, including: an obtaining module, configured to obtain a to-be-identified traffic flow, where the obtaining module is further configured to obtain to-be-identified terminal-side information and to-be-identified packet header statistics information based on the traffic flow, where the terminal-side information is used to indicate attribute information of a device associated with the traffic flow, and the packet header statistics information is information obtained by collecting statistics about packet header information in the traffic flow in a preset time window; and a determining module, configured to determine a type of the traffic flow based on the terminal-side information and the packet header statistics information by using a traffic flow identification model.

In a possible design, the traffic flow identification apparatus further includes: a sending module, configured to send the terminal-side information to a second device before the determining module determines a type of the traffic flow based on the terminal-side information and the packet header statistics information by using a traffic flow identification model; and a receiving model, configured to receive the traffic flow identification model that is sent by the second device and that corresponds to the terminal-side information.

In a possible design, the determining module is specifically configured to: generate an application sample based on the terminal-side information and the packet header statistics information, and determine the type of the traffic flow based on the application sample by using the traffic identification model.

In a possible design, the type of the traffic flow is an application type in the traffic flow, or the type of the traffic flow is an application type in the traffic flow and an application operation type in the traffic flow.

In a possible design, the traffic flow identification apparatus further includes an execution module, configured to perform a corresponding operation based on the type of the traffic flow.

In a possible design, when the apparatus is a terminal device or a base station, the terminal-side information includes at least one of the following: a brand of the terminal device, a model of the terminal device, a channel indicator of the terminal device, an operating system of the terminal device, a firmware version of the terminal device, and an application name in the traffic flow. Alternatively, when the apparatus is a router, the terminal-side information includes at least one of the following: a brand of the terminal device, a model of the terminal device, a channel indicator of the terminal device, an operating system of the terminal device, a firmware version of the terminal device, a brand of the router, a model of the router, an operating system of the router, and a firmware version of the router.

In a possible design, the packet header information includes at least one of the following: 5-tuple information in the traffic flow, a packet generation time point corresponding to the 5-tuple information, and a packet byte length corresponding to the 5-tuple information.

In a possible design, the packet header statistics information includes at least one of the following: an average value of packet byte lengths in the traffic flow, a largest value of the packet byte lengths in the traffic flow, a smallest value of the packet byte lengths in the traffic flow, an average value of time intervals between two adjacent packets in the traffic flow, a largest value of the time intervals between the two adjacent packets in the traffic flow, and a smallest value of the time intervals between the two adjacent packets in the traffic flow.

For beneficial effects of the traffic flow identification apparatus provided in the third aspect and the possible designs of the third aspect, refer to the beneficial effects brought by the first aspect and the possible implementations of the first aspect. Details are not described herein again.

According to a fourth aspect, this application provides a model generation apparatus, including: an obtaining module, configured to obtain packet header information in a to-be-trained traffic flow, to-be-trained terminal-side information, and a type of the to-be-trained traffic flow, where the terminal-side information is used to indicate attribute information of a device associated with the traffic flow, where the obtaining module is further configured to collect statistics about the packet header information in the traffic flow in a preset time window, to obtain to-be-trained packet header statistics information; and a generation module, configured to perform model training based on the terminal-side information, the packet header statistics information, and the type of the traffic flow, to generate a traffic flow identification model.

In a possible design, the generation module is specifically configured to: generate a training sample based on the terminal-side information and the packet header statistics information; determine an application type in the traffic flow as the type of the traffic flow; annotate a type of the training sample based on the type of the traffic flow, to obtain an annotated training sample; and perform model training based on the annotated training sample, to generate the traffic flow identification model.

In a possible design, the generation module is further specifically configured to determine the application type in the traffic flow and an application operation type in the traffic flow as the type of the traffic flow.

In a possible design, the generation module is further configured to generate N frequent itemsets based on the terminal-side information, where N is a positive integer; and the generation module is further specifically configured to: separately filter the annotated training sample based on the N frequent itemsets, to obtain a filtered training sample; and perform model training based on the filtered training sample, to generate the traffic flow identification model.

In a possible design, the terminal-side information includes at least one of the following: a brand of a terminal device, a model of the terminal device, a channel indicator of the terminal device, an operating system of the terminal device, a firmware version of the terminal device, a brand of a router, a model of the router, an operating system of the router, and a firmware version of the router.

In a possible design, the packet header information includes at least one of the following: 5-tuple information in the traffic flow, a packet generation time point corresponding to the 5-tuple information, and a packet byte length corresponding to the 5-tuple information.

In a possible design, the packet header statistics information includes at least one of the following: an average value of packet byte lengths in the traffic flow, a largest value of the packet byte lengths in the traffic flow, a smallest value of the packet byte lengths in the traffic flow, an average value of time intervals between two adjacent packets in the traffic flow, a largest value of the time intervals between the two adjacent packets in the traffic flow, and a smallest value of the time intervals between the two adjacent packets in the traffic flow.

For beneficial effects of the model generation apparatus provided in the fourth aspect and the possible designs of the fourth aspect, refer to the beneficial effects brought by the second aspect and the possible implementations of the second aspect. Details are not described herein again.

According to a fifth aspect, this application provides a communications device, including a memory and a processor.

The memory is configured to store program instructions.

The processor is configured to invoke the program instructions in the memory to perform the traffic flow identification method according to the first aspect or any possible design of the first aspect.

According to a sixth aspect, this application provides a communications device, including a memory and a processor.

The memory is configured to store program instructions.

The processor is configured to invoke the program instructions in the memory to perform the model generation method according to the second aspect or any possible design of the second aspect.

According to a seventh aspect, this application provides a readable storage medium. The readable storage medium stores executable instructions. When at least one processor of a communications device executes the executable instructions, the communications device performs the traffic flow identification method according to the first aspect or any possible design of the first aspect.

According to an eighth aspect, this application provides a readable storage medium. The readable storage medium stores executable instructions. When at least one processor of a communications device executes the executable instructions, the communications device performs the model generation method according to the second aspect or any possible design of the second aspect.

According to a ninth aspect, this application provides a program product. The program product includes executable instructions, and the executable instructions are stored in a readable storage medium. At least one processor of a communications device may read the execution instructions from the readable storage medium, and the at least one processor executes the execution instructions, so that the communications device implements the traffic flow identification method according to the first aspect or any possible design of the first aspect.

According to a tenth aspect, this application provides a program product. The program product includes executable instructions, and the executable instructions are stored in a readable storage medium. At least one processor of the communications device may read the execution instructions from the readable storage medium, and the at least one processor executes the execution instructions, so that the communications device implements the model generation method according to the second aspect or any possible design of the second aspect.

According to an eleventh aspect, this application provides a chip. The chip is connected to a memory, or a memory is integrated into the chip. When a software program stored in the memory is executed, the traffic flow identification method according to the first aspect or any possible design of the first aspect is implemented.

According to a twelfth aspect, this application provides a chip. The chip is connected to a memory, or a memory is integrated into the chip. When a software program stored in the memory is executed, the model generation method according to the second aspect or any possible design of the second aspect is implemented.

DESCRIPTION OF EMBODIMENTS

Figure 1:
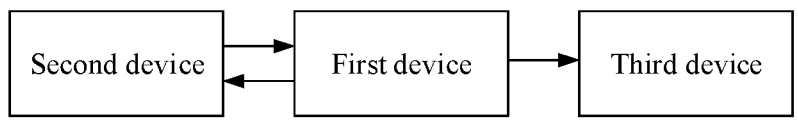
FIG. 1 is a schematic diagram of an architecture of a traffic flow processing system.

FIG. 1 is a schematic diagram of an architecture of a traffic flow processing system. As shown in FIG. 1, the traffic flow processing system in this application may include a first device and a second device, and the first device and the second device may be in wireless communication or wired communication.

The first device may obtain a traffic flow identification model from the second device, and apply the traffic flow identification model, to identify a type of a traffic flow. The second device may generate the traffic flow identification model, and serve as an application support of the first device, to provide the traffic flow identification model for the first device, so that the first device can identify the type of the traffic flow.

In addition, the traffic flow processing system in FIG. 1 may further include a third device, and the third device and the first device may be in wireless communication or wired communication. The first device may send, to the third device, a traffic flow that needs to be processed, so that the third device performs service processing on the traffic flow.

The first device mentioned in this application may include but is not limited to a network device such as a router, a switch, or a base station, or may be a terminal device. The second device mentioned in this application may include but is not limited to a server, such as a model server, configured to generate the traffic flow identification model, so that the first device invokes the traffic flow identification model from the model server when the type of the traffic flow needs to be identified. The third device mentioned in this application may include but is not limited to a traffic flow server corresponding to the service type, for example, a video traffic flow server, a call traffic flow server, or a game traffic flow server.

The terminal device may be a wireless terminal or a wired terminal. The wireless terminal may refer to a device that provides a user with voice and/or other service data connectivity, a handheld device with a radio connection function, or another processing device connected to a radio modem. The wireless terminal may communicate with one or more core networks through a RAN. The wireless terminal may be a mobile terminal, for example, a mobile phone (or referred to as a "cellular" phone) or a computer with a mobile terminal, or may be a portable, pocket-sized, handheld, computer built-in, or vehicle-mounted mobile apparatus, which exchanges voice and/or data with the radio access network. For example, the terminal device may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a remote station, a remote terminal, an access terminal, a user terminal, a user agent, or a user device (or user equipment). This is not limited herein.

To make a person skilled in the art better understand the technical solutions of the present invention, the following first describes a basic concept of the traffic flow.

The traffic flow refers to data exchanged between an application that implements a specific function (for example, a hypertext transfer protocol (HTTP) application traffic flow or a file transfer protocol (FTP) application traffic flow) and a server. A traffic flow includes two parts: real service data information, which is referred to as a packet for short; and control information indicating a flow direction, a protocol type, and the like of the service data information, which is referred to as packet header information for short.

An open systems interconnection reference model (OSI reference model) divides work of network communication into seven layers: a physical layer, a data link layer, a network layer, a transport layer, a session layer, a presentation layer, and an application layer. The packet header information in the traffic flow may be packet header information of each layer, and the packet header information includes 5-tuple information, a packet generation time point corresponding to the 5-tuple information, a packet byte length corresponding to the 5-tuple information, a sum of a byte length of the 5-tuple information and a packet byte length corresponding to the 5-tuple information. These packet header information is usually not encrypted.

The 5-tuple information includes a source internet protocol (IP) address, a source port, a destination IP address, a destination port, and a transmission protocol. In actual use, when the source IP address and source port are exchanged with the destination IP address and destination port, the source IP address and destination port are considered to be same 5-tuple information.

The 5-tuple information and a packet corresponding to the 5-tuple information may use a transmission control protocol (TCP), a user datagram protocol (UDP), or the like. The sum of the byte length of the 5-tuple information and the packet byte length corresponding to the 5-tuple information may be a packet byte length of an IP packet, or may be a byte length of a TCP packet, or may be a byte length of a UDP packet.

For example, the model generation method, apparatus, and device, and storage medium provided in this application are applied to the traffic flow processing system shown in FIG. 1, and are applicable to various scenarios in which a type of a traffic flow is identified. Based on the type of the traffic flow and packet header information, attribute information of a device associated with the traffic flow is fully considered, and a traffic flow identification model with high identification precision is generated. Therefore, the traffic flow identification model is used, so that the type of the traffic flow can be accurately identified, and an identification effect of the traffic flow can be improved.

Figure 2:
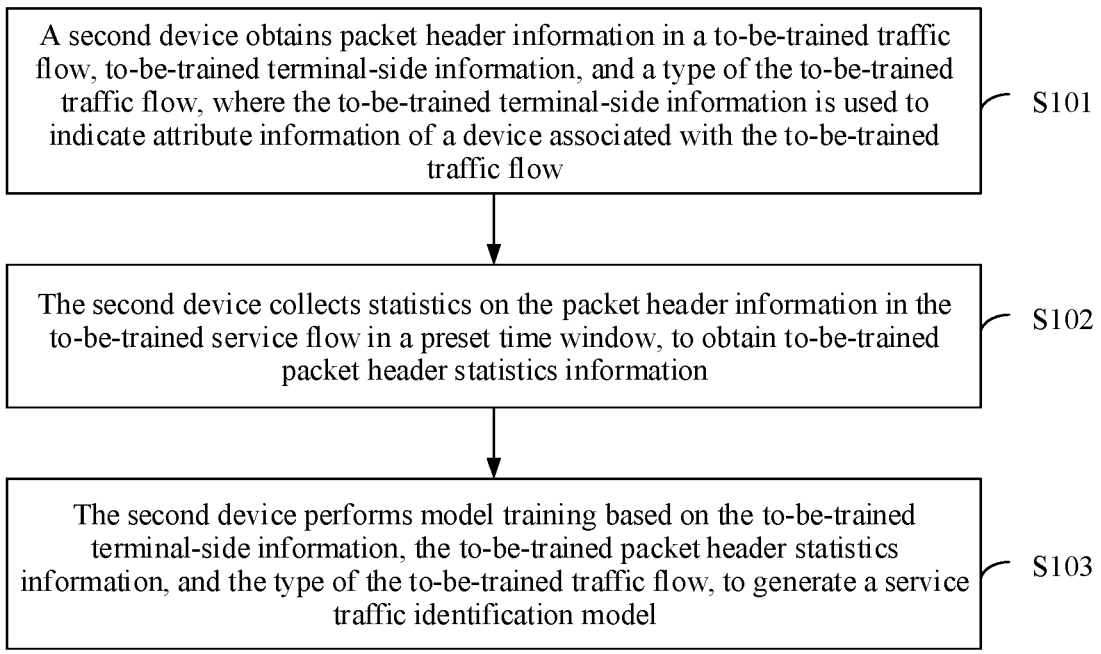
FIG. 2 is a schematic flowchart of a model generation method according to this application.

The following describes in detail the technical solution of the model generation method shown in FIG. 2 in this application by using the second device in FIG. 1 as an execution body.

FIG. 2 is a schematic flowchart of a model generation method according to this application. As shown in FIG. 2, the model generation method in this application may include the following steps.

S101: A second device obtains packet header information in a to-be-trained traffic flow, to-be-trained terminal-side information, and a type of the to-be-trained traffic flow, where the to-be-trained terminal-side information is used to indicate attribute information of a device associated with the to-be-trained traffic flow.

The "to-be-trained XX" mentioned in this application helps identify data "XX" required for training when the traffic flow identification model is generated, and substance of "XX" remains unchanged. For example, the to-be-trained traffic flow is a traffic flow required for training when the traffic flow identification model is generated, and substance of the traffic flow remains unchanged. The following "to-be-trained packet header statistics information" and "to-be-trained terminal-side information" have the foregoing meanings.

Based on the description of the traffic flow, a terminal device is usually used as a data support of the second device, and may provide, to the second device in various manners, data used to generate the traffic flow identification model, that is, the packet header information in the to-be-trained traffic flow, the to-be-trained terminal-side information, and a type of the to-be-trained traffic flow.

The terminal device may collect, in various manners, the data required for generating the traffic flow identification model. For example, a packet capturing tool may be disposed in the terminal device, and the packet header information may be obtained from the to-be-trained traffic flow by using the packet capturing tool.

For ease of storage, optionally, the terminal device may save the packet header information into a packet capturing file by using the packet capturing tool, and add annotation information to the packet capturing file in a manual manner or an automatic manner, where the annotation information is used to indicate the type of the traffic flow.

A traffic flow corresponding to a game application is used as an example. The annotation information may be a device ID number, a game name, a game start time point and a game end time point (for example. 2019-06-20 09:00:00 to 2019-06-20 10:00:00), a battle start time point and a battle end time point (for example, 2019-06-20 09:30:00 to 2019-06-20 09:50:00), and the like.

In addition, the terminal device may alternatively store the packet header information in another manner. This is not limited in this application.

Specific content of the packet header information is not limited in this application. Optionally, the packet header information may include at least one piece of 5-tuple information in the traffic flow, a packet generation time point corresponding to the 5-tuple information, and a packet byte length corresponding to the 5-tuple information. In addition, the packet header information may further include a transmission protocol of a packet, and the like.

For example, Table 1 shows the packet header information. The packet header information includes the 5-tuple information, the transmission protocol of the packet, the packet generation time point corresponding to the 5-tuple information, and the packet byte length corresponding to the 5-tuple information. For ease of explaining the packet header information, in Table 1, packet generation time points corresponding to the 5-tuple information are sorted, to generate a packet byte time sequence, where the packet byte time sequence includes the packet generation time points corresponding to the 5-tuple information and packet byte lengths corresponding to the 5-tuple information. In "2018-11-30 6:00:00 123, 60" in Table 1, "2018-11-30 6:00:00 123" indicates the packet generation time point corresponding to the 5-tuple information, "60" indicates the packet byte length corresponding to the 5-tuple information, and a unit is byte.

TABLE 1

| Quintuple information | | | | | |
|---|---|---|---|---|---|
| Source IP address | Source port | Destination IP address | Destination port | Transmission protocol of a packet | Packet byte time sequence |
| 10.7.1.8 | 123 | 202.119.17.24 | 80 | TCP | 2018-11-30 6:00:00 123, 60<br>2018-11-30 6:00:00 456, 70<br>2018-11-30 6:00:00 789, 90<br>. . . |
| 202.7.1.8 | 456 | 202.119.17.24 | 80 | TCP | 2018-11-30 6:01:00 789, 60<br>2018-11-30 6:01:01 123, 70<br>2018-11-30 6:03:00 123, 90<br>. . . |
| . . . | . . . | . . . | . . . | . . . | . . . |

The to-be-trained traffic flow may be a traffic flow between the terminal device and a router, or may be a traffic flow between the terminal device and a base station, and the to-be-trained terminal-side information is used to indicate the attribute information of the device associated with the to-be-trained traffic flow. Therefore, the terminal device may obtain the to-be-trained terminal-side information based on the attribute information of the terminal device, obtain attribute information of the router by using the packet capturing tool, and obtain the to-be-trained terminal-side information based on the attribute information of the router.

Specific content of the to-be-trained terminal-side information is not limited in this application. Optionally, the terminal-side information includes at least one of the following: a brand of the terminal device, a model of the terminal device, a channel indicator of the terminal device, an operating system of the terminal device, a firmware version of the terminal device, a brand of the router, a model of the router, an operating system of the router, and a firmware version of the router.

In this application, when obtaining the to-be-trained traffic flow, the terminal device easily learns the type of the to-be-trained traffic flow, and the terminal device may send the type of the to-be-trained traffic flow to the second device based on an actual situation. Because to-be-trained traffic flows are generated by different types of applications, the terminal device may classify the to-be-trained traffic flows based on application types in the to-be-trained traffic flows, to conveniently distinguish the to-be-trained traffic flows. This facilitates subsequent fine annotation of the to-be-trained packet header statistics information and the to-be-trained terminal-side information, to generate a traffic flow identification model applicable to a fine-grained scenario.

Figure 3:
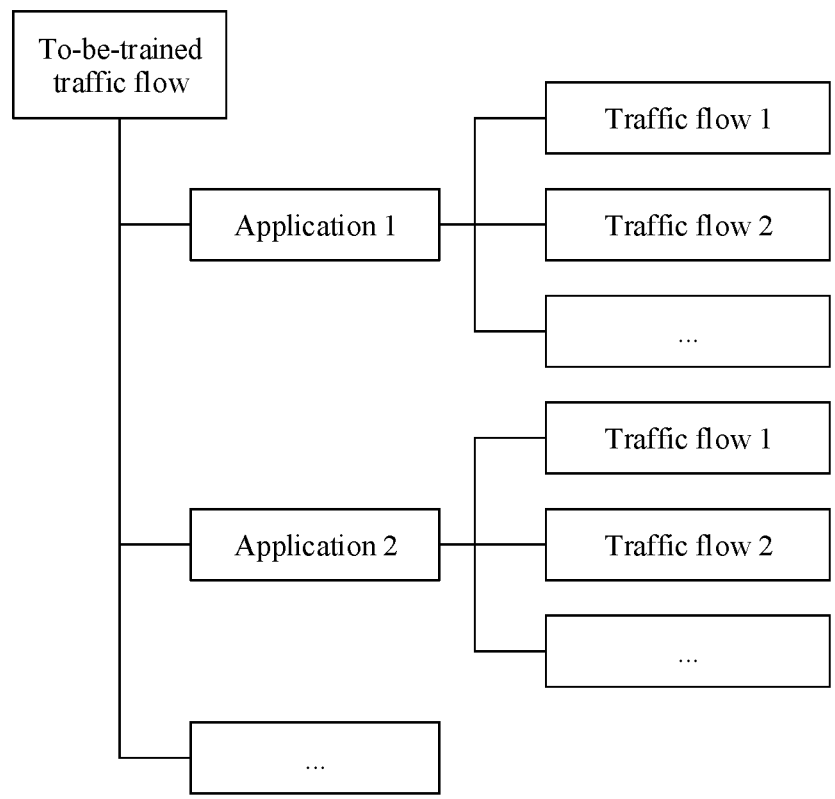
FIG. 3 is a schematic diagram of a to-be-trained traffic flow in a model generation method according to this application.

An application type in the to-be-trained traffic flow may include but is not limited to a type such as a game, a video, a call, a payment, or the like. For ease of description, FIG. 3 shows the to-be-trained traffic flows. The to-be-trained traffic flows include: a traffic flow 1 corresponding to an application 1, a traffic flow 2 corresponding to the application 1, and the like; and a traffic flow 1 corresponding to an application 2, a traffic flow 2 corresponding to the application 2, and the like.

In addition, because different operations in each application generate different traffic flows, the terminal device may further classify the to-be-trained traffic flows based on application types in the to-be-trained traffic flows and application operation types in the to-be-trained traffic flows, to further refine and distinguish the to-be-trained traffic flows. This facilitates subsequent annotation of the to-be-trained packet header statistics information and to-be-trained terminal-side information, to generate a traffic flow identification model applicable to a coarse-grained scenario.

The application operation types in the to-be-trained traffic flows may be classified based on applications corresponding to the application operation types. This is not limited in this application. Optionally, the application operation types may be divided based on an actual service requirement, for example, the application operation types in the game application may include a battle, hero selection, a dialogue, and other types. Application operation types in a payment application may include transfer, red packet grabbing, and the like. Optionally, the application operation types may also be accelerated based on an actual business requirement or divided based on priority setting. For example, the game application includes various types of acceleration levels, a battle traffic flow is set to a type of an acceleration level 1, a hero selection traffic flow is set to a type of an acceleration level 2, another traffic flow is set to a type of an acceleration level 3, and the like.

Figure 4:
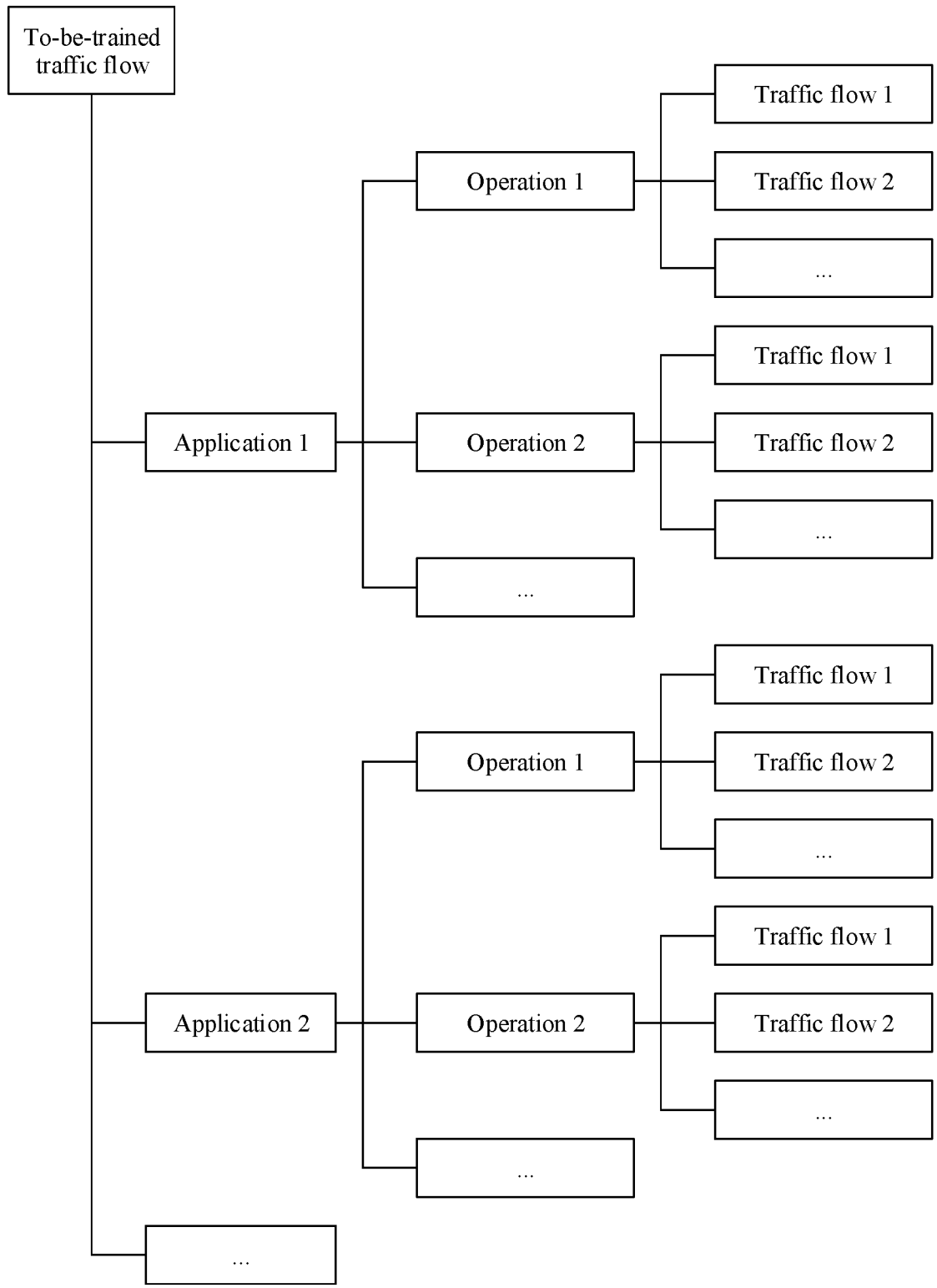
FIG. 4 is a schematic diagram of a to-be-trained traffic flow in a model generation method according to this application.

For ease of description, FIG. 4 shows to-be-trained traffic flows. The to-be-trained traffic flows include: a traffic flow 1, a traffic flow 2, and the like corresponding to an operation 1 in an application 1, a traffic flow 1, a traffic flow 2, and the like corresponding to an operation 2 in the application 1, a traffic flow 1, a traffic flow 2, and the like corresponding to an operation 1 in an application 2, a traffic flow 1, a traffic flow 2, and the like corresponding to an operation 2 in the application 2.

S102: The second device collects statistics about the packet header information in the to-be-trained traffic flow in a preset time window, to obtain the to-be-trained packet header statistics information.

Based on the foregoing description, the terminal device may receive a plurality of packets in a same time period. Therefore, to properly segment the packets, the second device may collect statistics about the packet header information in the to-be-trained traffic flow in the preset time window, to obtain the to-be-trained packet header statistics information.

Specific content of the to-be-trained packet header statistics information is not limited in this application. Optionally, the to-be-trained packet header statistics information may include at least one of an average value of packet byte lengths in the traffic flow, a largest value of the packet byte lengths in the traffic flow, a smallest value of the packet byte lengths in the traffic flow, an average value of time intervals between two adjacent packets in the traffic flow, a largest value of the time intervals between the two adjacent packets in the traffic flow, and a smallest value of the time intervals between the two adjacent packets in the traffic flow.

For example, Table 2 shows the to-be-trained packet header statistics information, and the to-be-trained packet header statistics information includes the largest value of the packet byte lengths in the traffic flow, the average value of the packet byte lengths in the traffic flow, the smallest value of the packet byte lengths in the traffic flow, and the average value of the time intervals between two adjacent packets in the traffic flow. For ease of explaining the to-be-trained packet header statistics information, in Table 2, an example in which the preset time window is 2 seconds is used to divide the packet byte time sequence in Table 1. In other words, statistics are collected on the packet byte time sequence in the preset time window (2 seconds), to generate the to-be-trained packet header statistics information.

TABLE 2

| Largest value of packet byte lengths in a traffic flow (Unit: byte) | Average value of packet byte lengths in a traffic flow (Unit: byte) | Smallest value of packet byte lengths in a traffic flow (Unit: byte) | Average value of time intervals between two adjacent packets in a traffic flow (Unit: millisecond) | |
|---|---|---|---|---|
| 150 | 100 | 60 | 1 | . . . |
| 200 | 100 | 60 | 2 | . . . |
| . . . | . . . | . . . | . . . | . . . |

It should be noted that, because the terminal device may send, to the second device, traffic flows corresponding to one or more application operations, and a traffic flow corresponding to each application operation may include one or more pieces of 5-tuple information in the preset time window, the second device may generate the packet header statistics information for a packet byte time sequence corresponding to one piece of 5-tuple information in the preset time window, or may generate the packet header statistics information for packet byte time sequences respectively corresponding to the plurality of pieces of 5-tuple information in the preset time window. This is not limited in this application.

It should be noted that, in S101 and S102, the packet capturing tool in the terminal device may capture the packet header information in the to-be-trained traffic flow, generate packet header statistics information based on the packet header information in the preset time window, save the packet header statistics information and the terminal-side information as the capturing file, and add the annotation information to the capturing file, to send the capturing file to the second device.

S103: The second device performs model training based on the to-be-trained terminal-side information, the to-be-trained packet header statistics information, and the type of the to-be-trained traffic flow, to generate the traffic flow identification model.

Because the device associated with the traffic flow may perform different processing, such as optimization or simplification, on the traffic flow, the second device may use the to-be-trained packet header statistics information and the to-be-trained terminal-side information as modeling features of the type of the to-be-trained traffic flow, and generate the traffic flow identification model after performing model training. In this way, impact caused when the device associated with the traffic flow performs processing is avoided, which improves identification accuracy of the traffic flow identification model, and enhances an identification effect of the traffic flow identification model.

It should be noted that, based on the embodiment shown in FIG. 2, the second device may generate one traffic identification model that can identify types of all traffic flows, or may generate a plurality of traffic flow identification models that can identify a type of a traffic flow, or may generate a plurality of traffic flow identification models that can identify types of some traffic flows. This is not limited in this application.

According to the model generation method provided in this application, the second device obtains the packet header information in the to-be-trained traffic flow, the to-be-trained terminal-side information used to indicate the attribute information of the device associated with the traffic flow, and the type of the to-be-trained traffic flow. The second device collects statistics about the packet header information in the to-be-trained traffic flow in the preset time window, to obtain the to-be-trained packet header statistics information. The second device performs model training based on the to-be-trained header statistics information, the to-be-trained terminal-side information, and the type of the to-be-trained traffic flow, to generate the traffic flow identification model. In this application, the type of the traffic flow and the packet header information are considered, and the attribute information of the device associated with the traffic flow is considered, to generate the traffic flow identification model with high identification precision and accuracy. In this way, the traffic flow identification model is used, so that an identification rate of the type of the traffic flow can be improved, and an identification effect of the type of the traffic flow can be ensured.

Based on the foregoing embodiment, the second device may store one or more traffic flow identification models. To reduce storage space of the second device, the second device may generate traffic flow identification models applicable to different identification scenarios, to cover all identification scenarios in an actual situation.

Figure 5:
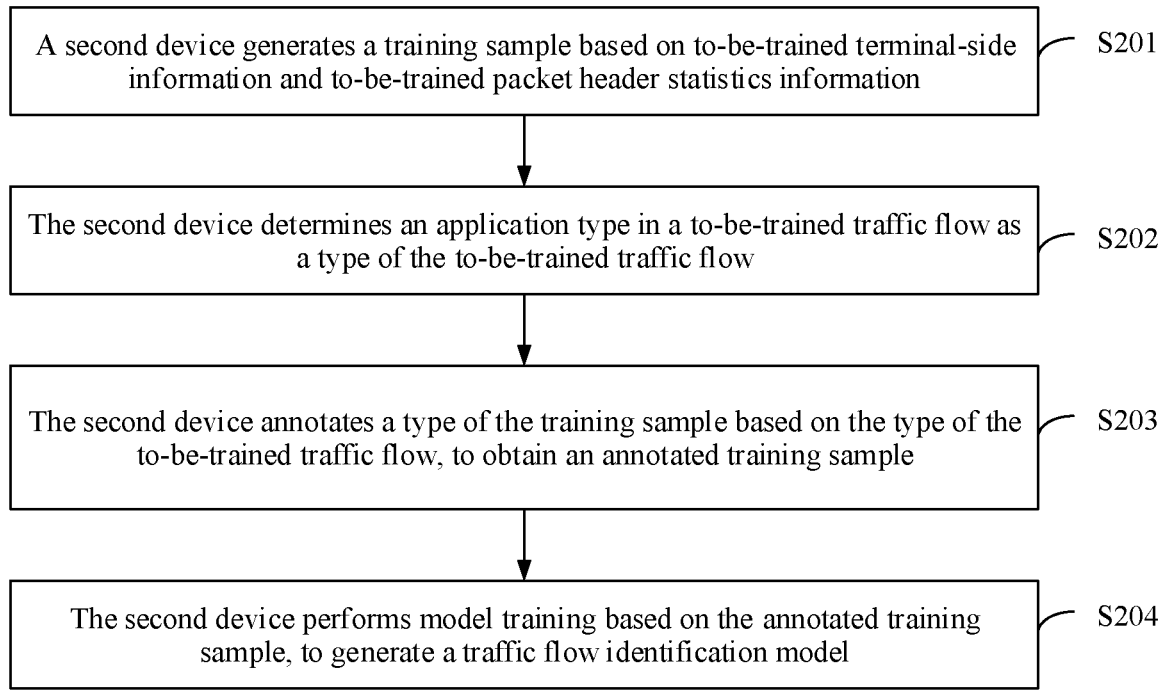
FIG. 5 is a schematic flowchart of a model generation method according to this application.
Figure 6:
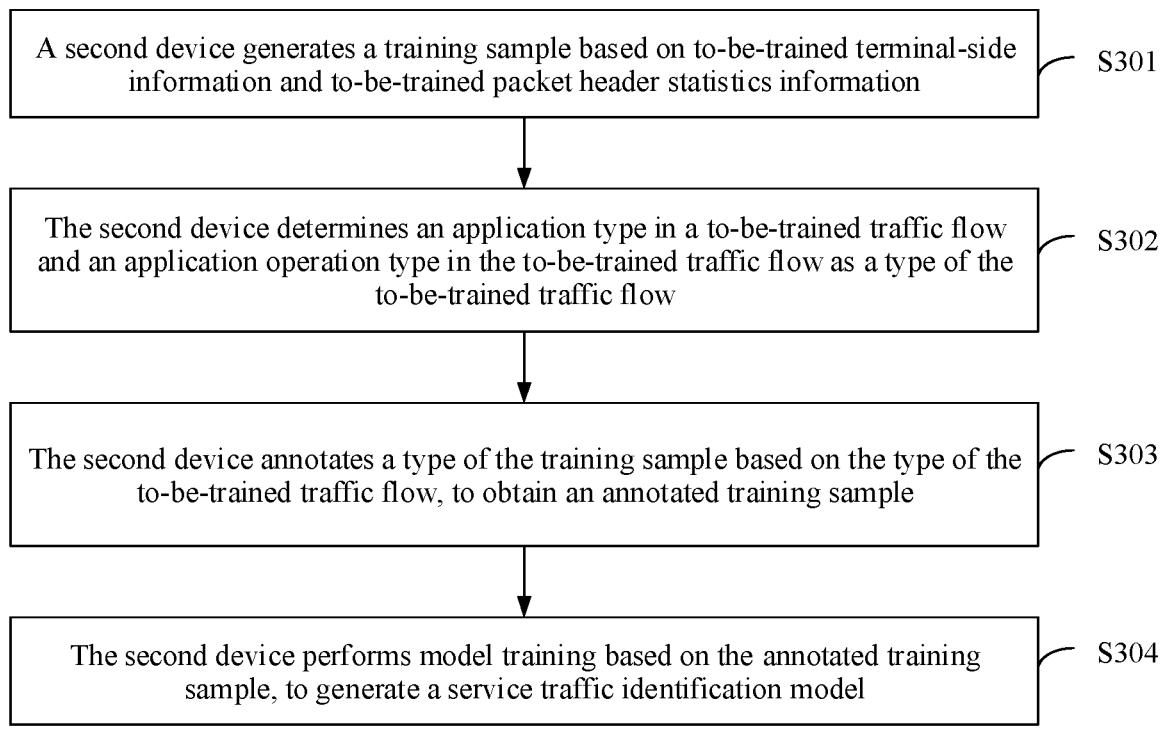
FIG. 6 is a schematic flowchart of a model generation method according to this application.

With reference to FIG. 5 and FIG. 6, an implementation process in which the second device separately generates a traffic flow identification model applicable to a coarse-grained identification scenario and a traffic flow identification model applicable to a fine-grained identification scenario is described below by example. The coarse-grained identification scenario may be set as a scenario corresponding to an application type in a traffic flow that can be identified by the traffic flow identification model, and the fine-grained identification scenario may be set as a scenario corresponding to an application operation type in a traffic flow that can be identified by the traffic flow identification model.

It should be noted that the coarse-grained identification scenario and the fine-grained identification scenario are not limited to the foregoing setting manners. For example, the coarse-grained identification scenario may be further set as a scenario in which an application operation type that can be identified by the traffic flow identification model in the traffic flow does not meet a preset quantity of times. The fine-grained identification scenario may be further set as a scenario in which an application operation type that can be identified by the traffic flow identification model in the traffic flow meets a preset quantity of times. The preset quantity of times may be set based on actual experience in this application.

FIG. 5 shows a process in which the second device generates a traffic flow identification model applicable to a coarse-grained scenario. As shown in FIG. 5, the model generation method in this application may include the following steps.

S201: The second device generates a training sample based on to-be-trained terminal-side information and to-be-trained packet header statistics information.

In this application, the second device may use the to-be-trained terminal-side information and the to-be-trained packet header statistics information as the training sample, to perform processing such as storage and update in a form of a table or a matrix.

For example, Table 3 shows the training sample. In Table 3, that the terminal-side information in the training sample includes a brand of a terminal device, the packet header statistics information in the training sample includes an average value of packet byte lengths in the traffic flow, a smallest value of the packet byte lengths in the traffic flow, and an average value of time intervals between two adjacent packets in the traffic flow, and the like are used as an example to illustrate the training sample.

TABLE 3

| Terminal-side information Brand of a terminal device | Packet header statistics information | | | |
|---|---|---|---|---|
| | Average value of packet byte lengths in a traffic flow (Unit: byte) | Smallest value of packet byte lengths in a traffic flow (Unit: byte) | Average value of time intervals between two adjacent packets in a traffic flow (Unit: millisecond) | ... |
| Brand 1 | 100 | 60 | 1 | ... |
| Brand 2 | 100 | 60 | 2 | ... |
| ... | ... | ... | ... | ... |

S202: The second device determines an application type in the to-be-trained traffic flow as a type of the to-be-trained traffic flow.

Because a quantity of application types is diverse, and usually an application type is a fixed type in an actual situation, the second device may directly determine the application type in the to-be-trained traffic flow as the type of the to-be-trained traffic flow, to reduce storage space of the second device and improve a model generation rate of the second device.

For the application type in the traffic flow, refer to the description in S101. Details are not described herein again.

S203: The second device annotates a type of the training sample based on the type of the to-be-trained traffic flow, to obtain an annotated training sample.

Based on the foregoing description, the to-be-trained terminal-side information and the to-be-trained packet header statistics information are obtained by using the to-be-trained traffic flow. Therefore, the type of the training sample may be consistent with the type of the to-be-trained traffic flow. Therefore, the second device may annotate the type of the to-be-trained traffic flow as the type of the training sample, to obtain the annotated training sample.

In addition, to better maintain the annotated training sample, the second device may store the annotated training sample in a form of a mapping table, a mapping matrix, or the like, to implement a correspondence between the to-be-trained terminal-side information and the to-be-trained packet header statistics information and the application type in the to-be-trained traffic flow.

For example, Table 4 shows the annotated training sample. The terminal-side information in the annotated training sample is a brand of a terminal device, and a packet header statistics type in the annotated training sample includes an average value of packet byte lengths in the traffic flow, a smallest value of the packet byte lengths in the traffic flow, an average value of time intervals between two adjacent packets in the traffic flow, and the like. The annotated training sample further includes the type of the training sample.

TABLE 4

| Terminal-side information Brand of a terminal device | Packet header statistics information | | | | Type of a training sample |
|---|---|---|---|---|---|
| | Average value of packet byte lengths in a traffic flow (Unit: byte) | Smallest value of packet byte lengths in a traffic flow (Unit: byte) | Average value of time intervals between two adjacent packets in a traffic flow (Unit: millisecond) | . . . | |
| Brand 1 | 100 | 60 | 1 | . . . | Game |
| Brand 2 | 100 | 60 | 2 | . . . | Video |
| . . . | . . . | . . . | . . . | . . . | |

S204: The second device performs model training based on the annotated training sample, to generate the traffic flow identification model.

The to-be-trained packet header statistics information and the to-be-trained terminal-side information in the annotated training sample may represent the to-be-trained traffic flow, and the application type in the to-be-trained traffic flow in the annotated training sample may represent the type of the to-be-trained traffic flow. Therefore, the second device may perform model training based on the annotated training sample, and may generate the traffic flow identification model for identifying the type of the traffic flow, which is applicable to the coarse-grained scenario of identifying the application type.

When performing model training, the second device may use various algorithms, for example, a C4.5 algorithm, a decision tree (Classification and Regression Tree, CAR) algorithm, or a random forest algorithm.

In this application, the second device may generate, based on the embodiment shown in FIG. 5, the traffic flow identification model applicable to the coarse-grained scenario, so that the second device provides a model that can identify an application type in a traffic flow.

FIG. 6 shows a process in which a second device generates a traffic flow identification model applicable to a fine-grained scenario. As shown in FIG. 6, the model generation method in this application may include the following steps.

S301: The second device generates a training sample based on to-be-trained terminal-side information and to-be-trained packet header statistics information.

An implementation of S301 is similar to the implementation of S201 in the embodiment in FIG. 5. Details are not described herein again.

S302: The second device determines an application type in a to-be-trained traffic flow and an application operation type in the to-be-trained traffic flow as a type of the to-be-trained traffic flow.

Because each application may include a plurality of types of application operations, the second device may jointly determine the application type in the to-be-trained traffic flow and the application operation type in the to-be-trained traffic flow as the type of the to-be-trained traffic flow, and further refine the to-be-trained traffic flow, to improve an identification capability of the traffic flow identification model.

For the application type in the traffic flow and the application operation type in the traffic flow, refer to descriptions in S101. Details are not described herein again.

S303: The second device annotates a type of the training sample based on the type of the to-be-trained traffic flow, to obtain an annotated training sample.

Based on the foregoing description, the to-be-trained terminal-side information and the to-be-trained packet header statistics information are obtained by using the to-be-trained traffic flow. Therefore, the type of the training sample may be consistent with the type of the to-be-trained traffic flow. Therefore, the second device may annotate the type of the to-be-trained traffic flow as the type of the training sample, to obtain the annotated training sample.

In addition, to better maintain the annotated training sample, the second device may store the annotated training sample in a form of a mapping table, a mapping matrix, or the like, to implement a correspondence between the terminal-side information and the packet header statistics information and the application type in the to-be-trained traffic flow and the application operation type in the to-be-trained traffic flow.

For example, Table 5 shows the annotated training sample. The terminal-side information in the annotated training sample is a brand of a terminal device, and a packet header statistics type in the annotated training sample includes an average value of packet byte lengths in the traffic flow, a smallest value of the packet byte lengths in the traffic flow, an average value of time intervals between two adjacent packets in the traffic flow, and the like. The annotated training sample further includes the type of the training sample. Compared with the type of the training sample in Table 4, the type of the training sample in Table 5 includes the application type in the traffic flow and the application operation type in the traffic flow.

and may include features such as a brand of the terminal device, a model of the terminal device, an application ID of the terminal device, an application version of the terminal device, a model of a router, a firmware version of the router, and an area in which the terminal device generates a traffic flow. The other type is a common modeling feature, and may be a feature such as a radio channel indicator of the terminal device.

In a specific embodiment, it is assumed that the terminal-side information is the brand (for example, a brand 1, a brand 2, a brand 3, a brand 4, or a brand 5) of the terminal device. The packet header statistics information is an average value (for example, 100 bytes, 200 bytes, or 400 bytes) of time intervals between two adjacent packets in the traffic flow. The second device may perform model training on the brand of the terminal device and the average value of the time intervals between two adjacent packets in the traffic

TABLE 5

| | Packet header statistics information | | | | |
|---|---|---|---|---|---|
| Terminal-side information Brand of a terminal device | Average value of packet byte lengths in a traffic flow (Unit: byte) | Smallest value of packet byte lengths in a traffic flow (Unit: byte) | Average value of time intervals between two adjacent packets in a traffic flow (Unit: millisecond) | . . . | Type of a training sample |
| Brand 1 | 100 | 60 | 1 | . . . | Hero changing in a game |
| Brand 2 | 100 | 60 | 2 | . . . | Movie in a video |
| . . . | . . . | . . . | . . . | . . . | |

S304: The second device performs model training based on the annotated training sample, to generate the traffic flow identification model.

The to-be-trained packet header statistics information and the to-be-trained terminal-side information in the annotated training sample may represent the to-be-trained traffic flow, and the application type in the to-be-trained traffic flow and the application operation type in the to-be-trained traffic flow in the annotated training sample, and may represent the type of the to-be-trained traffic flow in a refined manner. Therefore, the second device may perform model training based on the annotated training sample, and may generate the traffic flow identification model for identifying the type of the traffic flow, which is applicable to the fine-grained scenario of identifying the application type.

The second device may include but is not limited to performing model training by using the algorithms in S204. Details are not described herein again.

In this application, the second device may generate, based on the embodiment shown in FIG. 6, the traffic flow identification model applicable to the fine-grained scenario, so that the second device provides a model that can identify an application operation type in a traffic flow.

Based on the foregoing embodiments in FIG. 2 to FIG. 6, the second device may use all features in the terminal-side information as modeling features to construct a traffic flow identification model, or may use different values of one feature in the terminal-side information as modeling features to construct a plurality of traffic flow identification models. This is not limited in this application.

Figure 7:
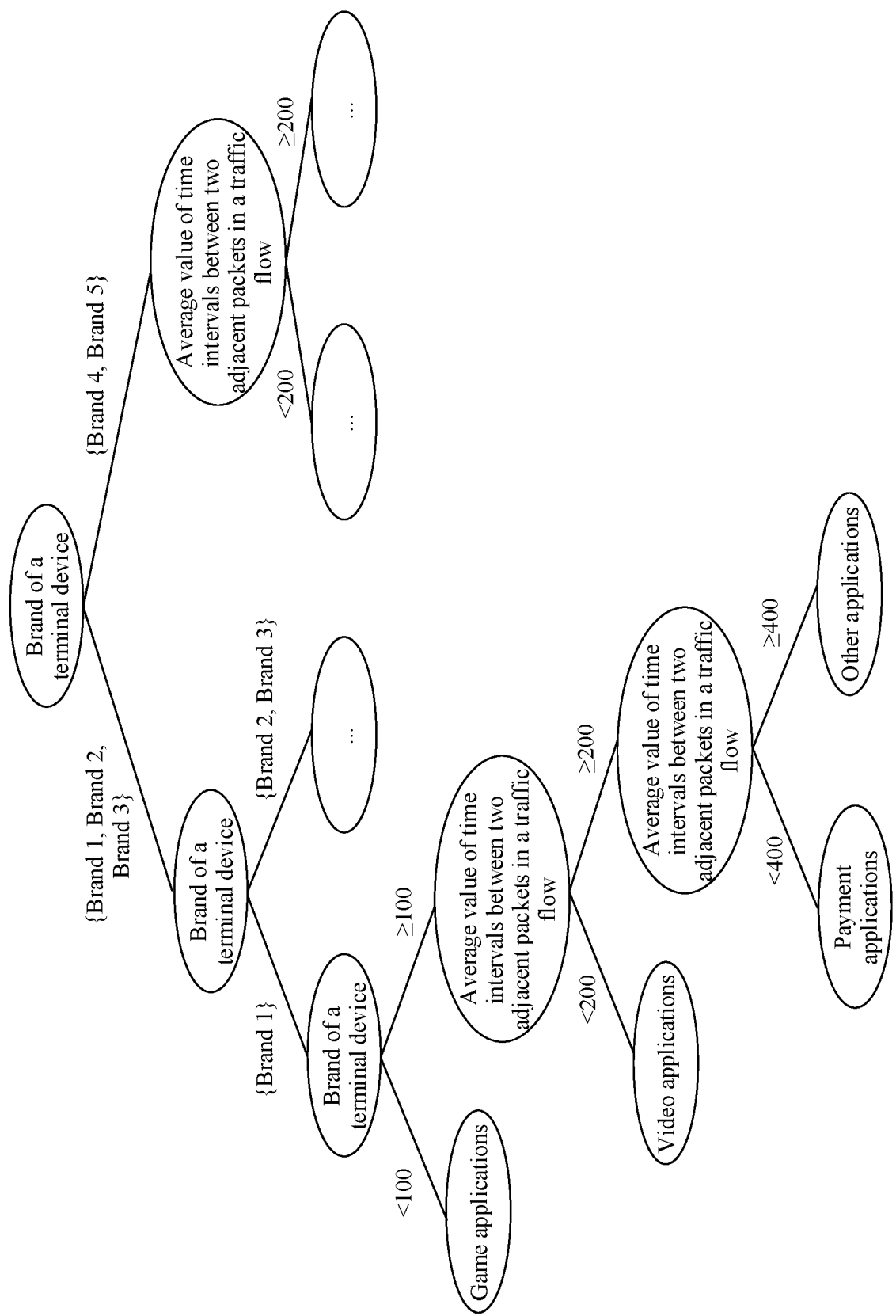
FIG. 7 is a schematic diagram of a traffic flow identification model in a model generation method according to this application.

For ease of managing the terminal-side information, in this application, the terminal-side information may be classified into two types. One type is a packet modeling feature, flow by using a CART algorithm, to generate the traffic flow identification model. For ease of description, the traffic flow identification model may be illustrated by using an example of a decision tree model in FIG. 7.

Compared with a conventional traffic flow identification model, after the second device adds the modeling feature of the brand of the terminal device to the packet header statistics information of the traffic flow, a scale of the traffic flow identification model increases, and especially when a quantity of features in the terminal-side information is excessively large, the scale of the traffic flow identification model is larger, which occupies excessive storage space of the second device, and causes problems such as low application efficiency and an excessively long identification process of the traffic flow identification model. In addition, an excessive quantity of traffic flow identification models constructed in the second device also causes the foregoing problems.

To resolve the foregoing problems, the second device may introduce one or more frequent itemsets associated with the to-be-trained terminal-side information, and filter the terminal-side information by introducing the frequent itemsets, to generate a simplified traffic flow identification model. In this way, the scale of the traffic flow identification model is reduced, the storage space of the second device is reduced, an identification rate of the traffic flow identification model is further improved, and an identification effect of the traffic flow identification model is effectively ensured.

Figure 8:
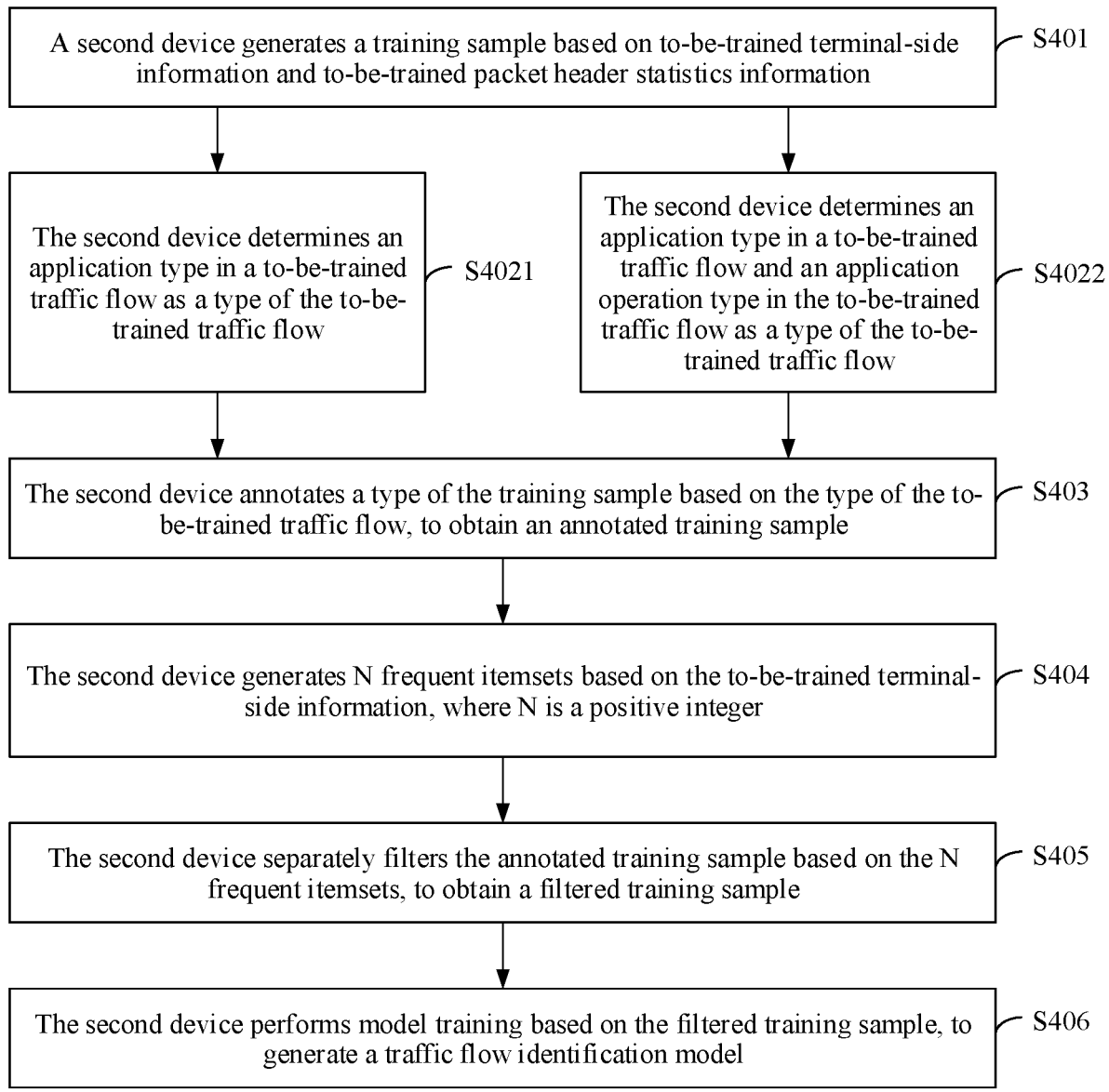
FIG. 8 is a schematic flowchart of a model generation method according to this application.

Based on the foregoing embodiments in FIG. 5 and FIG. 6, and with reference to FIG. 8, a specific implementation process in which the second device generates the simplified traffic flow identification model by introducing a frequent itemset to filter the terminal-side information is described.

FIG. 8 is a schematic flowchart of a model generation method according to this application. As shown in FIG. 8, the model generation method in this application may include the following steps.

S401: The second device generates a training sample based on to-be-trained terminal-side information and to-be-trained packet header statistics information.

An implementation of S401 is similar to the implementation of S201 in the embodiment in FIG. 5 or the implementation of S301 in the embodiment in FIG. 6. Details are not described herein again.

S4021: The second device determines an application type in a to-be-trained traffic flow as a type of the to-be-trained traffic flow.

An implementation of S4021 is similar to the implementation of S202 in the embodiment in FIG. 5. Details are not described herein again in this embodiment.

S4022: The second device determines an application type in a to-be-trained traffic flow and an application operation type in the to-be-trained traffic flow as a type of the to-be-trained traffic flow.

An implementation of S4022 is similar to the implementation of S302 in the embodiment in FIG. 6. Details are not described herein again.

S403: The second device annotates a type of the training sample based on the type of the to-be-trained traffic flow, to obtain an annotated training sample.

An implementation of S403 is similar to the implementation of S203 in the embodiment in FIG. 5 or the implementation of S303 in the embodiment in FIG. 6. Details are not described herein again.

S404: The second device generates N frequent itemsets based on the to-be-trained terminal-side information, where N is a positive integer.

In this application, the second device may use an association rule correlation algorithm (such as an Apriori algorithm or a FP-growth (frequent pattern growth) algorithm) based on the to-be-trained terminal-side information, to generate N frequent itemsets, so that the N frequent itemsets are associated with the to-be-trained terminal-side information.

The second device may construct any frequent itemset based on different values of one feature in the terminal-side information. For example, any frequent itemset is a different brand of a terminal device, or may combine a plurality of features in the terminal-side information to construct any frequent itemset based on an actual service requirement. For example, any frequent itemset is a brand of a terminal device and a model of a router. This is not limited in this application.

S405: The second device separately filters the annotated training sample based on the N frequent itemsets, to obtain a filtered training sample.

Because the frequent itemsets are associated with the terminal-side information, the annotated training sample includes the to-be-trained terminal-side information, the second device may separately perform filtering processing on the annotated training sample based on the N frequent itemsets, to filter the annotated training sample by retaining necessary terminal-side information by using the frequent itemsets, to obtain a simplified filtered training sample.

S406: The second device performs model training based on the filtered training sample, to generate the traffic flow identification model.

In this application, after obtaining the filtered training sample, the second device may perform model training based on the filtered training sample to generate the traffic flow identification model. In this way, a problem that a scale of the traffic flow identification model is excessively large due to excessive features in the terminal-side information is avoided, a traffic flow identification model does not need to be generated for each feature in the terminal-side information, and load and costs of maintaining and managing the traffic flow identification model are reduced.

The second device may include but is not limited to performing model training by using the algorithms in S204. Details are not described herein again.

In this application, the second device may generate the frequent itemsets based on the to-be-trained terminal-side information, and filter the training sample by using the frequent itemsets, to reduce the training sample for generating the traffic flow identification model, which ensures an identification capability of the traffic flow identification model, makes a small scale of the traffic flow identification mode to reduce storage space of the second device, and improves a model identification rate.

In a specific embodiment, the second device uses the embodiment shown in FIG. 8, and a specific implementation process includes the following steps.

Step 1: The second device obtains a training sample based on to-be-trained terminal-side information and to-be-trained packet header statistics information, and then annotates the training sample based on a type of a to-be-trained traffic flow, to generate an annotated training sample.

It is assumed that the to-be-trained terminal-side information collected by the second device is a brand of a terminal device and a number of a router, where the brand of the terminal device specifically includes a brand 1, a brand 2, a brand 3, a brand 4, a brand 5, or the like in Table 6. The number of the router specifically includes a router 100, a router 101, a router 102, a router 103, or the like in Table 6. In addition, "1" in Table 6 indicates that a router numbered XXX has a traffic flow in a terminal device of a brand X, and "0" indicates that a router numbered XXX does not have a traffic flow in a terminal device of a brand X.

TABLE 6

| Number of a router | Brand 1 | Brand 2 | Brand 3 | Brand 4 | Brand 5 | Brand 6 | ... |
|---|---|---|---|---|---|---|---|
| 100 | 1 | 1 | 0 | 0 | 0 | 0 | ... |
| 101 | 0 | 1 | 1 | 1 | 0 | 0 | ... |
| 102 | 1 | 0 | 1 | 0 | 1 | 0 | ... |
| 103 | 1 | 0 | 0 | 0 | 0 | 1 | ... |
| ... | ... | ... | ... | ... | ... | ... | ... |

Step 2: Assuming that a support degree is 100, the second device generates frequent itemsets of different levels based on different brands of the terminal device by using an Apriori algorithm. The frequent itemsets specifically include the following frequent itemsets:

A level-3 frequent itemset includes: {brand 1, brand 2, brand 3}.

Level-2 frequent itemsets include: {brand 1, brand 2}, {brand 1, brand 3}, {brand 2, brand 3}, {brand 5, brand 6}, {brand 1, brand 6}.

Level-1 frequent itemsets include: {brand 1}, {brand 2}, {brand 3}, {brand 6}, {brand 5}, and {brand 7}.

Step 3: The second device separately filters the annotated training sample based on the foregoing frequent itemsets of different levels, to obtain a filtered training sample.

In the level-2 frequent itemsets, the second device removes brand combinations covered by the level-3 frequent itemset, that is, filters out level-2 frequent itemsets included in the level-3 frequent itemset, to obtain remaining level-2 frequent itemsets: {brand 5, brand 6} and {brand 1, brand 6}. Then, in the level-1 frequent itemsets, the second device removes brand combinations covered by the level-2 frequent itemsets and the level-3 frequent itemset, that is, filters out level-1 frequent itemsets included in the level-3 frequent itemset or the level-2 frequent itemsets, to obtain a remaining level-1 frequent itemset: {brand 7}.

The second device obtains the filtered training sample constituted by four combinations: {brand 1, brand 2, brand 3}, {brand 5, brand 6}, {brand 1, brand 6}, and {brand 7}.

Step 4: The second device performs model training based on the filtered training sample formed by four combinations: {brand 1, brand 2, brand 3}, {brand 5, brand 6}, {brand 1, brand 6}, and {brand 7}, to generate a traffic flow identification model.

It should be noted that, based on the embodiment shown in FIG. 8, the second device may update the frequent itemsets based on an actual service requirement, so that the second device can identify different types of traffic flow identification models.

For example, the traffic flow identification method, apparatus, and device, and storage medium provided in this application are applied to the traffic flow processing system shown in FIG. 1, and are applicable to various scenarios in which a type of a traffic flow is identified. The traffic flow identification model generated in the embodiments in FIG. 2 to FIG. 8 may be applied, and on a basis that the attribute information of the device associated with the traffic flow is fully considered, the type of the traffic flow can be accurately identified, and an identification effect of the traffic flow can be improved.

Figure 9:
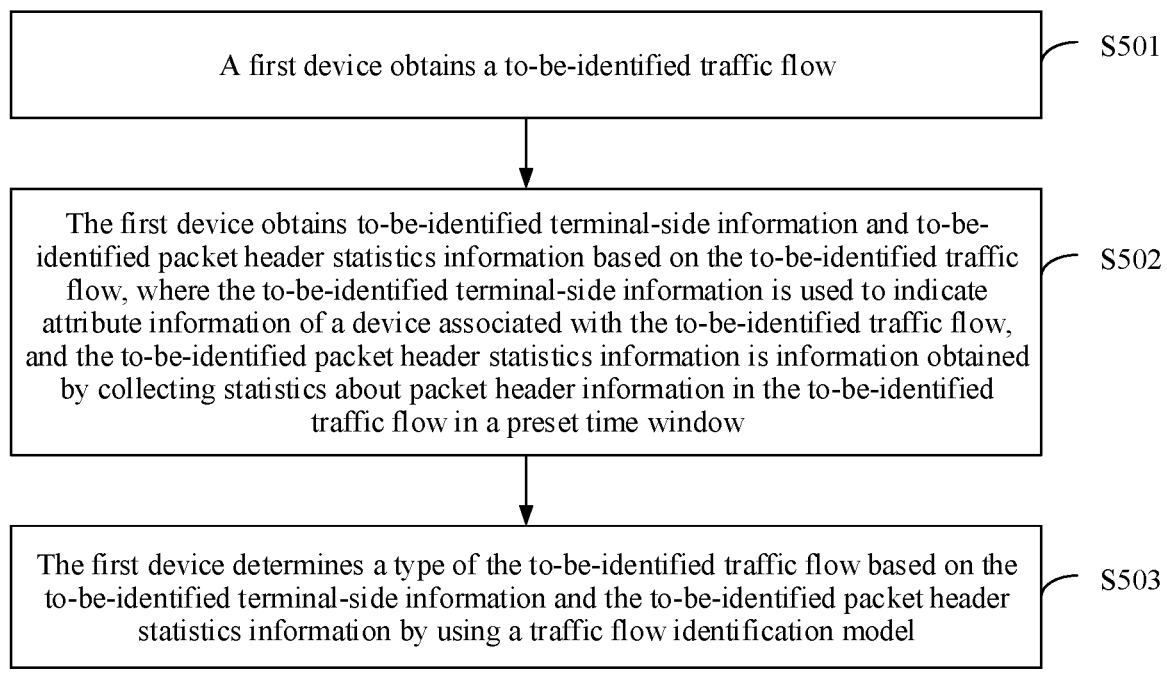
FIG. 9 is a schematic flowchart of a traffic flow identification method according to this application.

The following describes in detail the technical solution of the traffic flow identification method shown in FIG. 9 in this application by using the first device in FIG. 1 as an execution body.

FIG. 9 is a schematic flowchart of a traffic flow identification method according to this application. As shown in FIG. 9, the traffic flow identification method in this application may include the following steps.

S501: The first device obtains a to-be-identified traffic flow.

The "to-be-identified XX" mentioned in this application helps identify data "XX" identified by using a traffic flow identification model, and substance of "XX" remains unchanged. For example, the to-be-identified traffic flow is a traffic flow identified by using the traffic flow identification model, and substance of the traffic flow remains unchanged. The following "to-be-identified packet header statistics information" and "to-be-identified terminal-side information" have the foregoing meanings.

The to-be-identified traffic flow may be generated by the first device. For example, when the first device is a terminal device, the first device may obtain the to-be-identified traffic flow from each application based on an actual situation, or may receive the to-be-identified traffic flow from the terminal device. For example, when the first device is a network device such as a router or a base station, the first device may record service time of accessing the terminal device, and obtain the to-be-identified traffic flow from the terminal device. This is not limited in this application.

S502: The first device obtains the to-be-identified terminal-side information and the to-be-identified packet header statistics information based on the to-be-identified traffic flow, where the to-be-identified terminal-side information is used to indicate attribute information of a device associated with the to-be-identified traffic flow, and the to-be-identified packet header statistics information is information obtained by collecting statistics about packet header information in the to-be-identified traffic flow in a preset time window.

In this application, when the first device is the terminal device, because a to-be-trained traffic flow is provided by the terminal device, the first device may learn of to-be-identified terminal-side information. When the first device is the network device such as the router or the base station, the first device may obtain the to-be-identified terminal-side information in a plurality of manners. The following describes, by using three feasible implementations, a specific process in which the first device obtains the to-be-identified terminal-side information by using an example.

In a feasible implementation, the first device may obtain the to-be-identified terminal-side information according to a used communications protocol (for example, TCP/IP).

For example, the router may obtain a brand of the terminal device by accessing a media access control (MAC) address of the terminal device.

In another feasible implementation, the first device may obtain the to-be-identified terminal-side information by using a conventional technical means.

For example, because a model of the terminal device cannot be directly obtained by using a data link layer communications protocol for the traffic flow, the router may obtain the model of the terminal device from an unencrypted application packet by using a deep packet inspection (DPI) technology.

In still another feasible implementation, the first device may obtain the to-be-identified terminal-side information according to a proprietary protocol.

For example, the router may obtain the terminal-side information such as an operating system of the terminal device and an operating system version of the terminal device by using an unencrypted packet.

For another example, if the terminal device and the router are connected by using the IEEE 802.11 protocol, the router may obtain a wireless channel indicator, for example, a received signal strength indicator (RSSI), that is used when the terminal device is connected.

It should be noted that if the terminal device does not access a network through the router, but directly connects to the network through the base station, the base station may also obtain the terminal-side information in the foregoing similar manners. Details are not described herein again.

In this application, the first device may further collect statistics about the packet header information in the to-be-identified traffic flow in the preset time window, to obtain the to-be-identified packet header statistics information. It should be noted that the preset time window herein needs to remain the same as the preset time window used when the second device generates the to-be-trained packet header statistics information in S102, so that the first device can accurately identify a type of the to-be-identified traffic flow by using a corresponding traffic flow identification model. In addition, the first device and the second device may set the preset time window in advance based on an actual requirement. This is not limited in this application.

For the to-be-identified packet header statistics information, refer to the description of the to-be-trained packet header statistics information in S102. Details are not described herein again. In addition, for an implementation in which the first device obtains the to-be-identified packet header statistics information, refer to the description in which the second device obtains the to-be-trained packet header statistics information in S102. Details are not described herein again.

S503: The first device determines the type of the to-be-identified traffic flow based on the to-be-identified terminal-side information and the to-be-identified packet header statistics information by using the traffic flow identification model.

With reference to FIG. 1, the first device may obtain the traffic flow identification model from the second device in advance. Because the traffic identification model is generated based on the to-be-trained terminal-side information, the to-be-trained packet header statistics information, and the type of the to-be-trained traffic flow, the first device may determine the type of the to-be-identified traffic flow based on the to-be-identified terminal-side information and the to-be-identified packet header statistics information by using the traffic flow identification model.

Optionally, the first device may generate an application sample based on the to-be-identified terminal-side information and the to-be-identified packet header statistics information, which helps the first device filter unnecessary information, and helps the first device determine the type of the to-be-identified traffic flow by using the traffic identification model, to simplify an operation of the first device.

In this application, the type of the to-be-identified traffic flow may be determined based on the type of the traffic flow that can be identified by the traffic flow identification model.

Optionally, when the traffic flow identification model is obtained by using a feature in the to-be-trained packet header statistics information and a feature in the to-be-trained terminal-side information, the first device may determine the type of the to-be-identified traffic flow based on the type of the to-be-trained traffic flow used during model training. When the traffic flow identification model is obtained by using the feature in the to-be-trained packet header statistics information and a feature in filtering the to-be-trained terminal-side information based on a frequent itemset, the first device may determine the type of the to-be-identified traffic flow based on the frequent itemset and the type of the to-be-trained traffic flow used during model training. For the frequent itemset, refer to the description in the embodiment in FIG. 8. Details are not described herein again.

Optionally, when the traffic flow identification model is a model applicable to a coarse-grained scenario, the type of the to-be-identified traffic flow determined by the first device is an application type. When the traffic flow identification model is a model applicable to a fine-grained scenario, the type of the to-be-identified service that is determined by the first device is an application type and an application operation type. For the application type and the application operation type, refer to descriptions in S101. Details are not described herein again.

According to the traffic flow identification method provided in this application, the first device obtains the to-be-identified traffic flow, collects statistics about the packet header information in the to-be-identified traffic flow in the preset time window, to obtain the to-be-identified packet header statistics information, and obtains the to-be-identified terminal-side information based on the to-be-identified traffic flow. Further, the first device determines the type of the to-be-identified traffic flow based on the to-be-identified terminal-side information and the to-be-identified packet header statistics information by using the traffic flow identification model. In this application, the first device can fully consider, by using the traffic flow identification model, the attribute information of the device associated with the traffic flow, to improve an identification rate of the type of the traffic flow, and ensure an identification effect of the type of the traffic flow.

Based on the foregoing embodiment in FIG. 9, when the first device does not store the traffic flow identification model or the first device needs to update the traffic flow identification model stored in the first device, the first device may obtain the traffic flow identification model from the second device, to identify the type of the to-be-identified traffic flow.

Figure 10:
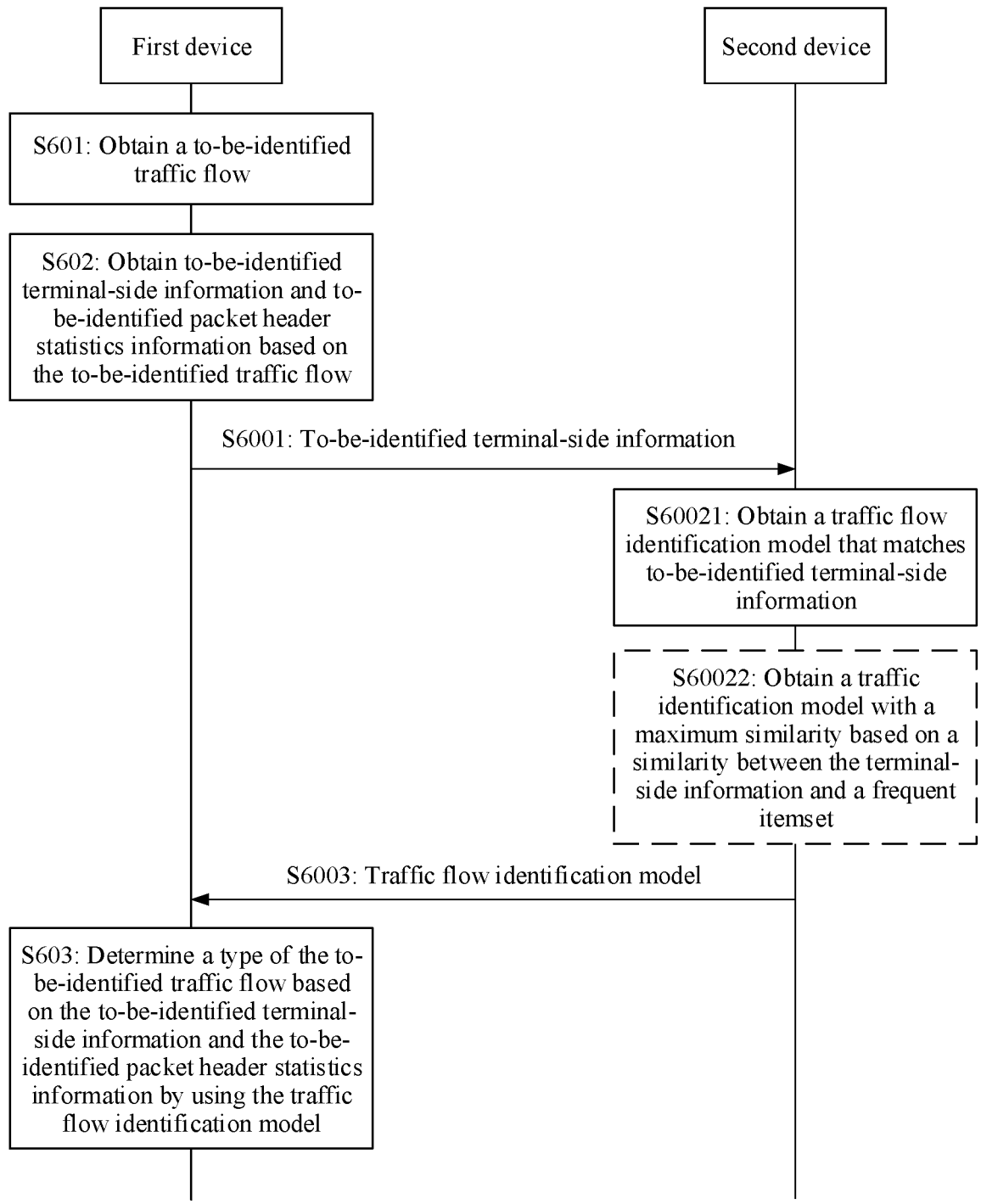
FIG. 10 is a signaling flowchart of a traffic flow identification method according to this application.

The following describes in detail the technical solution of the traffic flow identification method shown in FIG. 10 in this application by using the first device and the second device in FIG. 1 as execution bodies.

FIG. 10 is a signaling flowchart of a traffic flow identification method according to this application. As shown in FIG. 10, the traffic flow identification method in this application may include the following steps.

S601: The first device obtains a to-be-identified traffic flow.

S602: The first device obtains to-be-identified terminal-side information and to-be-identified packet header statistics information based on the to-be-identified traffic flow, where the to-be-identified terminal-side information is used to indicate attribute information of a device associated with the to-be-identified traffic flow, and the to-be-identified packet header statistics information is information obtained by collecting statistics about packet header information in the to-be-identified traffic flow in a preset time window.

Implementations of S601 and S602 are respectively similar to the implementations of S501 and S502 in the embodiment in FIG. 9. Details are not described herein again.

S6001: The first device sends the to-be-identified terminal-side information to the second device.

Because a traffic flow identification model stored in the second device is obtained by using a feature in the terminal-side information as a modeling feature, the first device may send the to-be-identified terminal-side information to the second device, so that the second device may determine a corresponding traffic flow identification model based on the to-be-identified terminal-side information.

In addition, because the second device stores one or more traffic flow identification models, and there are a plurality of types of traffic flow identification models, for example, the traffic flow identification model may be a general type, or may be a type applicable to a scenario, or may be a type applicable to a feature in the terminal-side information, or may be a type applicable to a feature combination in the terminal-side information. Therefore, when receiving the to-be-identified terminal-side information, the second device may first determine a type of the traffic identification model in the second device, and then accurately matches the traffic flow identification model based on the to-be-identified terminal-side information.

Optionally, if the second device stores the traffic flow identification model in the embodiments in FIG. 2 to FIG. 7, the second device may perform S60021 to S6003. If the second device stores the traffic flow identification model obtained by filtering the terminal-side information by using a frequent itemset, such as the traffic flow identification model in the embodiment in FIG. 8, the second device may perform S60022 to S6003. If the second device stores both the traffic flow identification model in the embodiments in FIG. 2 to FIG. 7 and the traffic flow identification model in the embodiment in FIG. 8, the second device may perform S60021 and S60022, and then perform S6003.

S60021: The second device obtains the traffic flow identification model that matches the to-be-identified terminal-side information.

In this application, the second device may obtain the corresponding traffic flow identification model by matching based on the to-be-identified terminal-side information. It should be noted that, when the second device matches a plurality of traffic flow identification models, the second device may randomly select one traffic flow identification model from the traffic flow identification models and send the traffic flow identification model to the first device, or may send all the traffic flow identification models to the first device, to provide a plurality of choices for the first device. This is not limited in this application.

S60022: The second device obtains, based on a similarity between the terminal-side information and a frequent itemset, a traffic identification model with a maximum similarity.

In this application, the second device may calculate, by using a plurality of methods, a similarity between the to-be-identified terminal-side information and a frequent itemset corresponding to each traffic flow identification model, and select the traffic flow identification model with the maximum similarity from the traffic flow identification models corresponding to a plurality of similarities.

For example, the second device may calculate a Jaccard coefficient based on the terminal-side information and the frequent itemset corresponding to each traffic flow identification model, where a formula of the Jaccard coefficient is $$J(A, B) = \frac{|A \cap B|}{|A \cup B|},$$

A is a brand set of a terminal device that is reported by the first device to the second device, where the to-be-identified terminal-side information is the brand set of the terminal device, and B is a frequent itemset corresponding to the traffic flow identification model in the second device. Therefore, a traffic flow identification model with a largest Jaccard coefficient is determined.

It is assumed that A is {brand 1, brand 2}, B in the second device includes a model 1, a model 2, and a model 3. A frequent itemset corresponding to the model 1 is {brand 1, brand 2, brand 3}, a frequent itemset corresponding to the model 2 is {brand 4, brand 5}, and a frequent itemset corresponding to model 1 is {brand 1, brand 5}.

A similarity $J(A, B_1)$ between A and the frequent itemset corresponding to the model 1 is calculated, $|A \cap B|$={brand 1, brand 2}, $|A \cup B|$={brand 1, brand 2, brand 3}, and $J(A, B_1)$=0.667.

A similarity $J(A, B_2)$ between A and the frequent itemset corresponding to the model 2 is calculated, $|A \cap B|$=empty set, $|A \cup B|$={brand 1, brand 2, brand 3, brand 4, brand 5}, and $J(A, B_2)$=0.

A similarity $J(A, B_3)$ between A and the frequent itemset corresponding to the model 3 is calculated, $|A \cap B|$={brand 1}, $|A \cup B|$={brand 1, brand 2, brand 5}, and $J(A, B_3)$=0.333.

$J(A, B_1)$, $J(A, B_2)$, and $J(A, B_3)$ and are compared, and the second device may determine that $J(A, B_3)$ is the largest. Therefore, the second device may send a traffic flow identification model of $J(A, B_3)$ to the first device.

It should be noted that, when the second device determines that there are a plurality of traffic flow identification models with the same maximum similarity, the second device may randomly select one traffic flow identification model from the traffic flow identification models and send the traffic flow identification model to the first device, or may send all the traffic flow identification models to the first device. This is not limited in this application.

S6003: The second device sends the traffic flow identification model to the first device.

In this application, after determining the traffic flow identification model based on the to-be-identified terminal-side information, the second device sends the traffic flow identification model to the first device, so that the first device determines a type of the to-be-identified traffic flow based on the traffic flow identification model, and the first device may perform a corresponding operation based on the type of the to-be-identified traffic flow.

S603: The first device determines the type of the to-be-identified traffic flow based on the to-be-identified terminal-side information and the to-be-identified packet header statistics information by using the traffic flow identification model.

An implementation of S603 is similar to the implementation of S503 in the embodiment in FIG. 9. Details are not described herein again.

In this application, when obtaining the to-be-identified traffic flow, the first device may obtain, from the second device, the traffic flow identification model that matches the to-be-identified terminal-side information, or may obtain the traffic identification model with the maximum similarity based on the similarity between the terminal-side information and the frequent itemset, or may simultaneously perform the foregoing two processes to invoke the traffic flow identification model or update the traffic flow identification model stored in the first device, to accurately identify the type of the traffic flow.

In addition, based on the foregoing embodiment, when determining the type of the to-be-identified traffic flow, the first device may perform, based on the type of the traffic flow, corresponding operations such as differentiated transmission of the traffic flow, flow control, and content control.

Optionally, the first device may preferentially send a traffic flow with a high QoS requirement to a corresponding service server.

For example, when a first application has a higher QoS requirement than a second application, when determining that to-be-identified traffic flows are respectively a traffic flow corresponding to the first application and a traffic flow corresponding to the second application, the first device may first send the traffic flow corresponding to the first application to the corresponding service server, and then send the traffic flow corresponding to the second application to the corresponding service server.

Optionally, the first device may preferentially send a traffic flow with a high latency requirement to the corresponding service server.

For example, because a game application has a higher latency requirement than a video application, when determining that to-be-identified traffic flows are respectively traffic flows corresponding to the game applications and traffic flows corresponding to the video applications, the first device may first send the traffic flows corresponding to the game applications to the corresponding service server, and then send the traffic flows corresponding to the video applications to the corresponding service server.

Optionally, the first device may delay sending a traffic flow of a preset type to the corresponding service server.

For example, when a first server learns that a processing rate of a service server corresponding to the traffic flow of the preset type is low, when determining that the type of the to-be-identified traffic flow is the preset type, the first device may send the to-be-identified traffic flow to the corresponding service server after delaying preset duration. Specific duration of the preset duration is not limited in this application.

Optionally, the first device may not send the traffic flow of the preset type to the corresponding service server.

For example, when an operation a in an application A is not suitable for viewing by a child, when determining that the type of the to-be-identified traffic flow is an application operation type a in the application A, the first device may not send a traffic flow corresponding to the application operation type a in the application A to the corresponding service server.

It should be noted that the first device includes but is not limited to performing the foregoing corresponding operations based on the type of the traffic flow.

Figure 11:
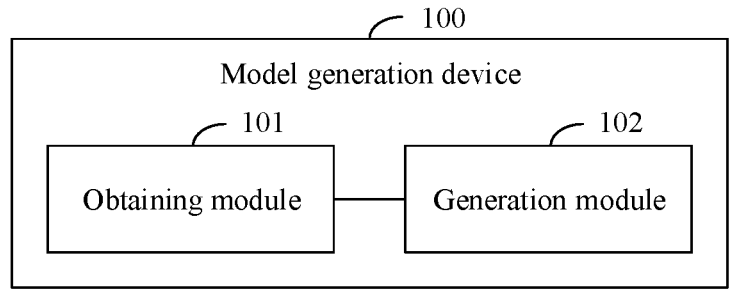
FIG. 11 is a schematic diagram of a structure of a model generation apparatus according to this application.

For example, this application further provides a model generation apparatus. FIG. 11 is a schematic diagram of a structure of a model generation apparatus according to this application. As shown in FIG. 11, the model generation apparatus 100 usually refers to a model server, and a communication channel may be established between the model generation apparatus 100 and a first device. The first device may include but is not limited to a network device such as a router, a switch, or a base station, or may be a terminal device. The model generation apparatus 100 serves as an application support of the first device, and may provide a traffic flow identification model for the first device, to implement an operation corresponding to the second device in any one of the foregoing method embodiments. The model generation apparatus 100 in this application may include an obtaining module 101 and a generation module 102.

The obtaining module 101 is configured to obtain packet header information in a to-be-trained traffic flow, to-be-trained terminal-side information, and a type of the to-be-trained traffic flow, where the terminal-side information is used to indicate attribute information of a device associated with the traffic flow. The obtaining module 101 is further configured to collect statistics about the packet header information in the traffic flow in a preset time window, to obtain to-be-trained packet header statistics information. The generation module 102 is configured to perform model training based on the terminal-side information, the packet header statistics information, and the type of the traffic flow, to generate a traffic flow identification model.

In some embodiments, the generation module 102 is specifically configured to: generate a training sample based on the terminal-side information and the packet header statistics information; determine an application type in the traffic flow as the type of the traffic flow; annotate a type of the training sample based on the type of the traffic flow, to obtain an annotated training sample; and perform model training based on the annotated training sample, to generate the traffic flow identification model.

In some embodiments, the generation module 102 is further specifically configured to determine the application type in the traffic flow and an application operation type in the traffic flow as the type of the traffic flow.

In some embodiments, the generation module 102 is further configured to generate N frequent itemsets based on the terminal-side information, where N is a positive integer. The generation module 102 is further specifically configured to: separately filter the annotated training sample based on the N frequent itemsets, to obtain a filtered training sample; and perform model training based on the filtered training sample, to generate the traffic flow identification model.

In some embodiments, the terminal-side information includes at least one of the following: a brand of a terminal device, a model of the terminal device, a channel indicator of the terminal device, an operating system of the terminal device, a firmware version of the terminal device, a brand of a router, a model of the router, an operating system of the router, and a firmware version of the router.

In some embodiments, the packet header information includes at least one of the following: 5-tuple information in the traffic flow, a packet generation time point corresponding to the 5-tuple information, and a packet byte length corresponding to the 5-tuple information.

In some embodiments, the packet header statistics information includes at least one of the following: an average value of packet byte lengths in the traffic flow, a largest value of the packet byte lengths in the traffic flow, a smallest value of the packet byte lengths in the traffic flow, an average value of time intervals between two adjacent packets in the traffic flow, a largest value of the time intervals between the two adjacent packets in the traffic flow, and a smallest value of the time intervals between the two adjacent packets in the traffic flow.

The model generation apparatus in this embodiment of this application may be configured to implement the technical solutions in the foregoing method embodiments. An implementation principle and technical effects thereof are similar to those in the method embodiments. Details are not described herein again.

Figure 12:
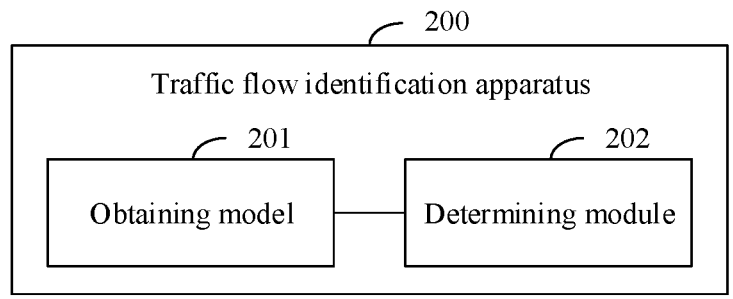
FIG. 12 is a schematic diagram of a structure of a traffic flow identification apparatus according to this application.

For example, this application further provides a traffic flow identification apparatus. FIG. 12 is a schematic diagram of a structure of a traffic flow identification apparatus according to this application. As shown in FIG. 12, the traffic flow identification apparatus 200 may usually include but is not limited to a network device such as a router, a switch, or a base station, or may be a terminal device. In addition, a communication channel may be established between the traffic flow identification apparatus 200 and a second device. The traffic flow identification apparatus 200 obtains a traffic flow identification model from the second device (for example, a model server), to identify a type of a traffic flow. A communication channel may be further established between the traffic flow identification apparatus 200 and a third device (for example, a service server), where the traffic flow identification apparatus 200 may select a corresponding manner (for example, delaying, differentiating transmission, controlling traffic transmission, or limiting content transmission) after determining the type of the traffic flow to send the traffic flow to the third server, to implement an operation corresponding to the first device in any one of the foregoing method embodiments. The traffic flow identification apparatus 200 in this application may include an obtaining module 201 and a determining module 202.

The obtaining module 201 is configured to obtain a to-be-identified traffic flow. The obtaining module 201 is further configured to obtain to-be-identified terminal-side information and to-be-identified packet header statistics information based on the traffic flow, where the terminal-side information is used to indicate attribute information of a device associated with the traffic flow, and the packet header statistics information is information obtained by collecting statistics about packet header information in the traffic flow in a preset time window. The determining module 202 is configured to determine a type of the traffic flow based on the terminal-side information and the packet header statistics information by using a traffic flow identification model.

Figure 13:
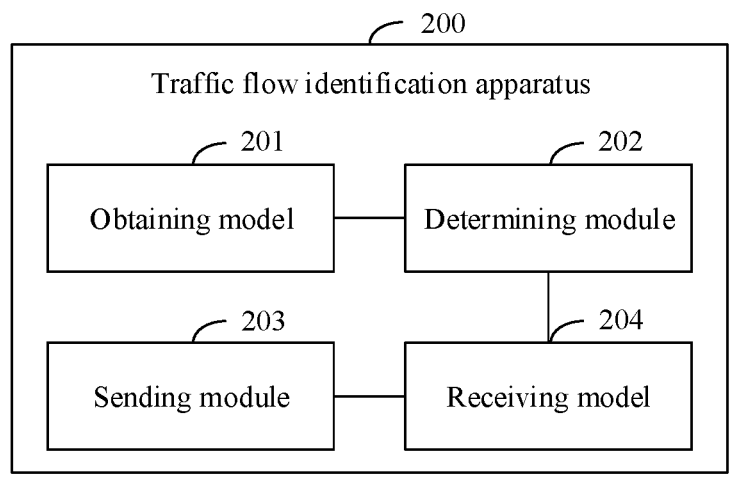
FIG. 13 is a schematic diagram of a structure of a traffic flow identification apparatus according to this application.

FIG. 13 is a schematic diagram of a structure of a traffic flow identification apparatus according to this application. As shown in FIG. 13, based on the structure shown in FIG. 12, the traffic flow identification apparatus 200 in this application may further include a sending module 203 and a receiving model 204.

The sending module 203 is configured to send the terminal-side information to a second device before the determining module 202 determines a type of the traffic flow based on the terminal-side information and the packet header statistics information by using a traffic flow identification model. The receiving model 204 is configured to receive the traffic flow identification model that is sent by the second device and that corresponds to the terminal-side information.

In some embodiments, the determining module 202 is specifically configured to: generate an application sample based on the terminal-side information and the packet header statistics information, and determine the type of the traffic flow based on the application sample by using the traffic identification model.

In some embodiments, the type of the traffic flow is an application type in the traffic flow, or the type of the traffic flow is an application type in the traffic flow and an application operation type in the traffic flow.

Figure 14:
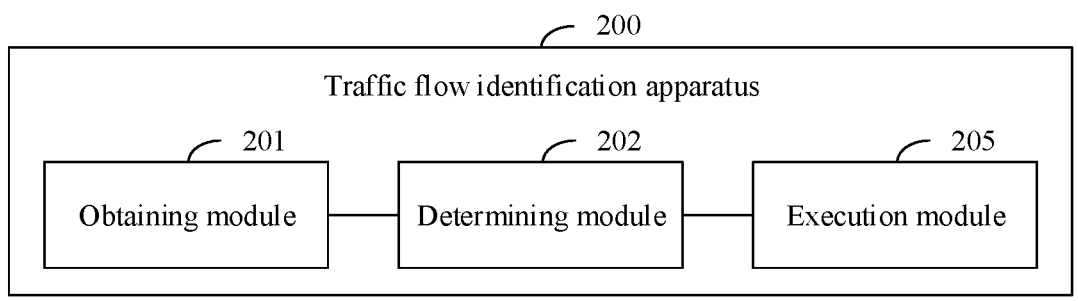
FIG. 14 is a schematic diagram of a structure of a traffic flow identification apparatus according to this application.

FIG. 14 is a schematic diagram of a structure of a traffic flow identification apparatus according to this application. As shown in FIG. 14, based on the structure shown in FIG. 12, the traffic flow identification apparatus 200 in this application may further include an execution module 205.

The execution module 205 is configured to perform a corresponding operation based on the type of the traffic flow.

In some embodiments, when the traffic flow identification apparatus 200 is a terminal device or a base station, the terminal-side information includes at least one of the following: a brand of the terminal device, a model of the terminal device, a channel indicator of the terminal device, an operating system of the terminal device, a firmware version of the terminal device, and an application name in the traffic flow.

Alternatively, when the traffic flow identification apparatus 200 is a router, the terminal-side information includes at least one of the following: a brand of the terminal device, a model of the terminal device, a channel indicator of the terminal device, an operating system of the terminal device, a firmware version of the terminal device, a brand of the router, a model of the router, an operating system of the router, and a firmware version of the router.

In some embodiments, the packet header information includes at least one of the following: 5-tuple information in the traffic flow, a packet generation time point corresponding to the 5-tuple information, and a packet byte length corresponding to the 5-tuple information.

In some embodiments, the packet header statistics information includes at least one of the following: an average value of packet byte lengths in the traffic flow, a largest value of the packet byte lengths in the traffic flow, a smallest value of the packet byte lengths in the traffic flow, an average value of time intervals between two adjacent packets in the traffic flow, a largest value of the time intervals between the two adjacent packets in the traffic flow, and a smallest value of the time intervals between the two adjacent packets in the traffic flow.

The traffic flow identification device in this embodiment of this application may be used to execute the technical solutions of the foregoing method embodiments. The implementation principles and technical effects are similar, and are not further described herein.

Figure 15:
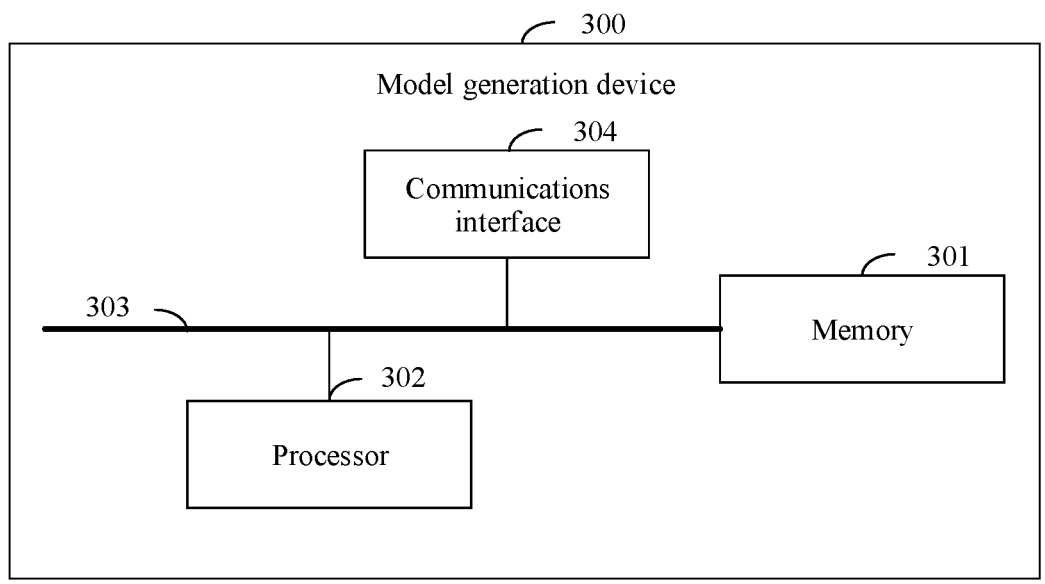
FIG. 15 is a schematic diagram of a hardware structure of a model generation device according to this application.

FIG. 15 is a schematic diagram of a hardware structure of a model generation device according to this application. As shown in FIG. 15, the model generation device 300 usually refers to a model server, and a communication channel may be established between the model generation device 300 and a first device. The first device may include but is not limited to a network device such as a router, a switch, or a base station, or may be a terminal device. As an application support of the first device, the model generation device 300 may provide a traffic flow identification model for the first device, to implement an operation corresponding to the second device in any one of the foregoing method embodiments. The model generation device 300 in this application may include a memory 301 and a processor 302. The memory 301 may be connected to the processor 302 through a bus 303.

The memory 301 is configured to store program code.

The processor 302 is configured to invoke the program code, and when the program code is executed, the program code is configured to perform the model generation method in any one of the foregoing embodiments. For details, refer to related descriptions in the foregoing method embodiments.

Optionally, in this application, a communications interface 304 is further included. The communications interface 304 may be connected to the processor 302 through the bus 303. The processor 302 may control the communications interface 303 to implement the foregoing receiving and sending functions of the model generation device 300.

The model generation device in this embodiment of this application may be configured to implement the technical solutions in the foregoing method embodiments. An implementation principle and technical effects thereof are similar to those in the method embodiments. Details are not described herein again.

Figure 16:
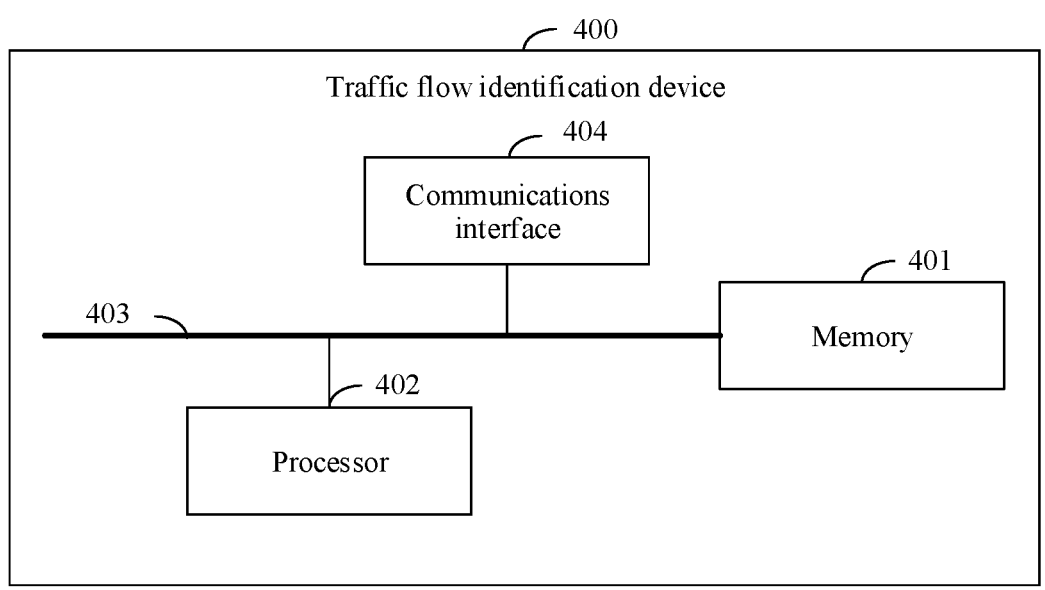
FIG. 16 is a schematic diagram of a hardware structure of a traffic flow identification device according to this application.

FIG. 16 is a schematic diagram of a hardware structure of a traffic flow identification device according to this application. As shown in FIG. 16, the traffic flow identification device 400 may usually include but is not limited to a network device such as a router, a switch, or a base station, or may be a terminal device. In addition, a communication channel may be established between the traffic flow identification device 400 and a second device. The traffic flow identification device 400 obtains a traffic flow identification model from the second device (for example, a model server), to identify a type of a traffic flow. A communication channel may be further established between the traffic flow identification device 400 and a third device (for example, a service server). The traffic flow identification device 400 may select a corresponding manner (for example, delaying, differentiating transmission, controlling traffic transmission, or limiting content transmission) after determining a type of a traffic flow to send the traffic flow to the third server, to implement an operation corresponding to the first device in any one of the foregoing method embodiments. The traffic flow identification device 400 in this application may include a memory 401 and a processor 402. The memory 401 may be connected to the processor 402 through a bus 403.

The memory 401 is configured to store program code.

The processor 402 is configured to invoke the program code, and when the program code is executed, the program code is configured to perform the traffic flow identification method in any one of the foregoing embodiments. For details, refer to related descriptions in the foregoing method embodiments.

Optionally, in this application, a communications interface 404 is included. The communications interface 404 may be connected to the processor 402 through the bus 403. The processor 402 may control the communications interface 403 to implement the foregoing receiving and sending functions of the traffic flow identification device 400.

The traffic flow identification device in this embodiment of this application may be used to execute the technical solutions of the foregoing method embodiments. The implementation principles and technical effects are similar, and are not further described herein.

In a plurality of embodiments provided in this application, it should be understood that the disclosed device and method may be implemented in other manners. For example, the described device embodiment is merely an example. For example, module division is merely logical function division and may be other division in actual implementation. For example, a plurality of modules may be combined or integrated into another system, or some features may be ignored or not be performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. Some or all of the modules may be selected according to actual needs to achieve the objectives of the solutions of the embodiments of this application.

In addition, functional modules in the embodiments of this application may be integrated into one processing unit, or each of the modules may exist alone physically, or two or more modules are integrated into one unit. The integrated unit may be implemented in a form of hardware, or may be implemented in a form of hardware in addition to a software functional unit.

When the foregoing integrated module is implemented in a form of a software functional module, the integrated unit may be stored in a computer-readable storage medium. The software function module is stored in a storage medium and includes several instructions for instructing a computer device (which may be a personal computer, a server, or a network device) or a processor to perform some of the steps of the methods described in the embodiments of this application.

It should be understood that the processor may be a central processing unit (CPU), or may be another general-purpose processor, a digital signal processor (DSP), an application-specific integrated circuit (\ ASIC), or the like. The general purpose processor may be a microprocessor, or the processor may be any conventional processor, or the like. The steps of the method disclosed with reference to the present invention may be directly performed by a hardware processor, or may be performed by using a combination of hardware in the processor and a software module.

The memory may include a high-speed RAM memory, and may further include a non-volatile memory NVM, for example, at least one magnetic disk memory, or may be a USB flash drive, a removable hard disk, a read-only memory, a magnetic disk, an optical disc, or the like.

The bus may be an industry standard architecture (ISA) bus, a peripheral component interconnect (PCI) bus, an extended industry standard architecture (EISA) bus, or the like. Buses may be classified into an address bus, a data bus, a control bus, and the like. For ease of representation, the bus in the accompanying drawings of this application is not limited to only one bus or one type of bus.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A traffic flow identification method comprising:
   obtaining, by a first device, a to-be-identified traffic flow;
   obtaining, by the first device, to-be-identified terminal-side information and to-be-identified packet header statistics information based on the traffic flow, wherein the terminal-side information indicates attribute information of a device associated with the traffic flow, and the packet header statistics information is information obtained by collecting statistics about packet header information in the traffic flow in a preset time window;
   sending, by the first device, a terminal-side information to a second device; and
   receiving, by the first device, a traffic flow identification model that is sent by the second device and that corresponds to the terminal-side information; and
   determining, by the first device, a type of the traffic flow based on the terminal-side information and the packet header statistics information by using the traffic flow identification model.

2. The method according to claim 1 wherein the determining, by the first device, the type of the traffic flow based on the terminal-side information and the packet header statistics information by using the traffic flow identification model comprises:
  generating, by the first device, an application sample based on the terminal-side information and the packet header statistics information; and
  determining, by the first device, the type of the traffic flow based on the application sample by using the traffic identification model.

3. The method according to claim 1, wherein the type of the traffic flow is an application type in the traffic flow, or the type of the traffic flow is an application type in the traffic flow and an application operation type in the traffic flow.

4. The method according to claim 1, further comprising:
  performing, by the first device, a corresponding operation based on the type of the traffic flow.

5. The method according to claim 1, wherein:
  in response to the first device being a terminal device or a base station, the terminal-side information comprises at least one of the following:
    a brand of the terminal device, a model of the terminal device, a channel indicator of the terminal device, an operating system of the terminal device, a firmware version of the terminal device, and an application name in the traffic flow; or
  in response to the first device being a router, the terminal-side information comprises at least one of the following:
    the brand of the terminal device, the model of the terminal device, the channel indicator of the terminal device, the operating system of the terminal device, the firmware version of the terminal device, a brand of the router, a model of the router, an operating system of the router, and a firmware version of the router.

6. The method according to claim 1, wherein the packet header information comprises at least one of the following:
  5-tuple information in the traffic flow, a packet generation time point corresponding to the 5-tuple information, and a packet byte length corresponding to the 5-tuple information.

7. The method according to claim 1, wherein the packet header statistics information comprises at least one of the following:
  an average value of packet byte lengths in the traffic flow, a maximum value of the packet byte lengths in the traffic flow, a minimum value of the packet byte lengths in the traffic flow, an average value of time intervals between two adjacent packets in the traffic flow, a maximum value of the time intervals between the two adjacent packets in the traffic flow, and a minimum value of the time intervals between the two adjacent packets in the traffic flow.

8. A model generation method comprising:
  obtaining, by a second device, packet header information in a to-be-trained traffic flow, to-be-trained terminal-side information, and a type of the traffic flow, wherein the terminal-side information indicates attribute information of a device associated with the traffic flow;
  collecting, by the second device, statistics about the packet header information in the traffic flow in a preset time window, to obtain to-be-trained packet header statistics information;
  performing, by the second device, model training based on the terminal-side information, the packet header statistics information, and the type of the traffic flow, to generate a traffic flow identification model, wherein the model training comprises:
    generating a training sample based on the terminal-side information and the packet header statistics information;
    determining an application type in the traffic flow as the type of the traffic flow;
    annotating, by the second device, a type of the training sample based on the type of the traffic flow, to obtain an annotated training sample; and
    performing model training based on the annotated training sample, to generate the traffic flow identification model.

9. The method according to claim 8, wherein the determining, by the second device, the application type in the traffic flow as the type of the traffic flow comprises:
  determining, by the second device, the application type in the traffic flow and an application operation type in the traffic flow as the type of the traffic flow.

10. The method according to claim 8, wherein the method further comprises:
  generating, by the second device, N frequent item sets based on the terminal-side information, wherein N is a positive integer; and
  wherein the performing, by the second device, the model training based on the annotated training sample, to generate the traffic flow identification model comprises:
    separately filtering, by the second device, the annotated training sample based on the N frequent item sets, to obtain a filtered training sample; and
    performing, by the second device, model training based on the filtered training sample, to generate the traffic flow identification model.

11. The method according to claim 8, wherein the terminal-side information comprises at least one of the following:
  a brand of a terminal device, a model of the terminal device, a channel indicator of the terminal device, an operating system of the terminal device, a firmware version of the terminal device, a brand of a router, a model of the router, an operating system of the router, and a firmware version of the router.

12. The method according to claim 8, wherein the packet header information comprises at least one of the following:
  5-tuple information in the traffic flow, a packet generation time point corresponding to the 5-tuple information, and a packet byte length corresponding to the 5-tuple information.

13. The method according to claim 8, wherein the packet header statistics information comprises at least one of the following:
  an average value of packet byte lengths in the traffic flow, a maximum value of the packet byte lengths in the traffic flow, a minimum value of the packet byte lengths in the traffic flow, an average value of time intervals between two adjacent packets in the traffic flow, a maximum value of the time intervals between the two adjacent packets in the traffic flow, and a minimum value of the time intervals between the two adjacent packets in the traffic flow.

14. A communications device, comprising:
  a processor; and
  a memory, configured to store executable instructions which are executed by the processor and cause the processor to perform:

obtaining a to-be-identified traffic flow;

obtaining to-be-identified terminal-side information and to-be-identified packet header statistics information based on the traffic flow, wherein the terminal-side information indicates attribute information of a device associated with the traffic flow, and the packet header statistics information is information obtained by collecting statistics about packet header information in the traffic flow in a preset time window;

sending the terminal-side information to a second device;

receiving a traffic flow identification model that is sent by the second device and that corresponds to the terminal-side information; and determining a type of the traffic flow based on the terminal-side information and the packet header statistics information by using the traffic flow identification model.

15. The communication device according to claim 14, wherein the processor is configured to perform:

generating an application sample based on the terminal-side information and the packet header statistics information; and determining the type of the traffic flow based on the application sample by using the traffic identification model.

16. The communication device according to claim 14, wherein the type of the traffic flow is an application type in the traffic flow, or the type of the traffic flow is an application type in the traffic flow and an application operation type in the traffic flow.

17. The communication device according to claim 14, wherein the processor is configured to perform a corresponding operation based on the type of the traffic flow.

18. The communication device according to claim 14, wherein the terminal-side information comprises at least one of the following: a brand of a terminal device, a model of the terminal device, a channel indicator of the terminal device, an operating system of the terminal device, a firmware version of the terminal device, and an application name in the traffic flow; a brand of a router, a model of the router, an operating system of the router, and a firmware version of the router.

19. The communication device according to claim 14, wherein the packet header information comprises at least one of the following:

5-tuple information in the traffic flow, a packet generation time point corresponding to the 5-tuple information, and a packet byte length corresponding to the 5-tuple information.

20. The communication device according to claim 14, wherein the packet header statistics information comprises at least one of the following:

an average value of packet byte lengths in the traffic flow, a maximum value of the packet byte lengths in the traffic flow, a minimum value of the packet byte lengths in the traffic flow, an average value of time intervals between two adjacent packets in the traffic flow, a maximum value of the time intervals between the two adjacent packets in the traffic flow, and a minimum value of the time intervals between the two adjacent packets in the traffic flow.

* * * * *

UNITED STATES PATENT AND TRADEMARK OFFICE
CERTIFICATE OF CORRECTION

| | | |
|---|---|---|
| PATENT NO. | : 12,177,087 B2 | Page 1 of 1 |
| APPLICATION NO. | : 17/624190 | |
| DATED | : December 24, 2024 | |
| INVENTOR(S) | : Li et al. | |

It is certified that error appears in the above-identified patent and that said Letters Patent is hereby corrected as shown below:

In the Claims

Claim 1: Column 34, Line 57: "sending, by the first device, a terminal-side information to" should read as -- sending, by the first device, the terminal-side information to --.

Signed and Sealed this
Tenth Day of June, 2025

Coke Morgan Stewart
*Acting Director of the United States Patent and Trademark Office*